United States Patent
Kirkwood et al.

(10) Patent No.: US 6,945,375 B2
(45) Date of Patent: *Sep. 20, 2005

(54) TORQUE TRANSFER DEVICE HAVING AN ELECTRIC MOTOR/BRAKE ACTUATOR AND FRICTION CLUTCH

(75) Inventors: Malcolm E. Kirkwood, Livonia, MI (US); Thomas C. Bowen, Rochester Hills, MI (US)

(73) Assignee: Magna Drivetrain of America, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/973,071

(22) Filed: Oct. 25, 2004

(65) Prior Publication Data

US 2005/0079943 A1 Apr. 14, 2005

Related U.S. Application Data

(63) Continuation of application No. 10/371,415, filed on Feb. 21, 2003, now Pat. No. 6,808,053.

(51) Int. Cl.[7] ............................ B60K 17/35; F16D 28/00
(52) U.S. Cl. ........................ 192/84.6; 192/84.7; 192/94; 180/249
(58) Field of Search ................ 192/35, 84.6, 84.7, 192/84.91, 94; 180/248–250; 74/89.31

(56) References Cited

U.S. PATENT DOCUMENTS

| | | | |
|---|---|---|---|
| 2,072,832 A | 3/1937 | Weydell | |
| 3,235,045 A | 2/1966 | Pop | |
| 4,805,486 A | 2/1989 | Hagiwara et al. | |
| 4,895,236 A | 1/1990 | Sakakibara et al. | |
| 4,936,428 A | 6/1990 | Leigh-Monstevens et al. | |
| 4,976,347 A | 12/1990 | Sakakibara et al. | |
| 5,007,886 A | 4/1991 | Holmquist et al. | |
| 5,199,325 A | 4/1993 | Reuter et al. | |
| 5,323,871 A | 6/1994 | Wilson et al. | |
| 5,407,024 A | 4/1995 | Watson et al. | |
| 5,423,235 A | 6/1995 | Botterill et al. | |
| 5,562,192 A | 10/1996 | Dick | |
| 6,398,686 B1 | 6/2002 | Irwin | |
| 6,484,857 B2 | 11/2002 | Vonnegut et al. | |
| 6,808,053 B2 * | 10/2004 | Kirkwood et al. | 192/84.6 |

FOREIGN PATENT DOCUMENTS

| | | |
|---|---|---|
| JP | 62-18117 | 1/1987 |
| JP | 3-66927 | 3/1991 |

* cited by examiner

Primary Examiner—Richard M. Lorence
(74) Attorney, Agent, or Firm—Harness, Dickey & Pierce P.L.C.

(57) ABSTRACT

A torque transfer mechanism is provided for controlling the magnitude of a clutch engagement force exerted on a multi-plate clutch assembly that is operably disposed between a first rotary and a second rotary member. The torque transfer mechanism includes a clutch actuator assembly for generating and applying a clutch engagement force on the clutch assembly. The clutch actuator assembly includes an electric motor/brake unit, a torque/force conversion mechanism, and a force amplification mechanism. The motor/brake unit can be operated in either of a motor mode or a brake mode to cause bi-directional linear movement of an output member of the torque/force conversion mechanism. The thrust force generated by the torque/force conversion mechanism is increased by the force amplification mechanism with the resultant clutch engagement force applied to the clutch assembly. The dual mode feature of the electric motor/brake unit significantly reduces the power requirements.

49 Claims, 13 Drawing Sheets

TORQUE TRANSFER DEVICE HAVING AN ELECTRIC MOTOR/BRAKE ACTUATOR AND FRICTION CLUTCH

CROSS-REFERENCE TO RELATED APPLICATIONS

This application is a continuation of U.S. patent application Ser. No. 10/371,415 filed Feb. 1, 2003, now U.S. Pat. No. 6,808,053.

FIELD OF THE INVENTION

The present invention relates generally to power transfer systems for controlling the distribution of drive torque between the front and rear drivelines of a four-wheel drive vehicle and/or the left and right wheels of an axle assembly. More particularly, the present invention is directed to a power transmission device for use in motor vehicle driveline applications having a torque transfer mechanism equipped with a power-operated clutch actuator that is operable for controlling actuation of a multi-plate friction clutch.

BACKGROUND OF THE INVENTION

In view of increased demand for four-wheel drive vehicles, a plethora of power transfer systems are currently being incorporated into vehicular driveline applications for transferring drive torque to the wheels. In many vehicles, a power transmission device is operably installed between the primary and secondary drivelines. Such power transmission devices are typically equipped with a torque transfer mechanism for selectively and/or automatically transferring drive torque from the primary driveline to the secondary driveline to establish a four-wheel drive mode of operation. For example, the torque transfer mechanism can include a dog-type lock-up clutch that can be selectively engaged for rigidly coupling the secondary driveline to the primary driveline to establish a "part-time" four-wheel drive mode. When the lock-up clutch is released, drive torque is only delivered to the primary driveline for establishing a two-wheel drive mode.

A modern trend in four-wheel drive motor vehicles is to equip the power transmission device with an adaptively controlled transfer clutch in place of the lock-up clutch. The transfer clutch is operable for automatically directing drive torque to the secondary wheels, without any input or action on the part of the vehicle operator, when traction is lost at the primary wheels for establishing an "on-demand" four-wheel drive mode. Typically, the transfer clutch includes a multi-plate clutch assembly that is installed between the primary and secondary drivelines and a clutch actuator for generating a clutch engagement force that is applied to the clutch assembly. The clutch actuator can be a power-operated device that is actuated in response to electric control signals sent from an electronic controller unit (ECU). Variable control of the electric control signal is typically based on changes in current operating characteristics of the vehicle (i.e., vehicle speed, interaxle speed difference, acceleration, steering angle, etc.) as detected by various sensors. Thus, such "on-demand" transfer clutch can utilize adaptive control schemes for automatically controlling torque distribution during all types of driving and road conditions.

A large number of on-demand transfer clutches have been developed with an electrically-controlled clutch actuator that can regulate the amount of drive torque transferred to the secondary output shaft as a function of the value of the electrical control signal applied thereto. In some applications, the transfer clutch employs an electromagnetic clutch as the power-operated clutch actuator. For example, U.S. Pat. No. 5,407,024 discloses an electromagnetic coil that is incrementally activated to control movement of a ball-ramp drive assembly for applying a clutch engagement force to the multi-plate clutch assembly. Likewise, Japanese Laid-open Patent Application No. 62-18117 discloses a transfer clutch equipped with an electromagnetic actuator for directly controlling actuation of the multi-plate clutch pack assembly.

As an alternative, the transfer clutch can employ an electric motor and a drive assembly as the power-operated clutch actuator. For example, U.S. Pat. No. 5,323,871 discloses an on-demand transfer case having a transfer clutch equipped with an electric motor that controls rotation of a sector plate which, in turn, controls pivotal movement of a lever arm that is operable for applying the clutch engagement force to the multi-plate clutch assembly. In addition, Japanese Laid-open Patent Application No. 63-66927 discloses a transfer clutch which uses an electric motor to rotate one cam plate of a ball-ramp operator for engaging the multi-plate clutch assembly. Finally, U.S. Pat. Nos. 4,895,236 and 5,423,235 respectively disclose a transfer case equipped with a transfer clutch having an electric motor driving a reduction gearset for controlling movement of a ball screw operator and a ball-ramp operator which, in turn, apply the clutch engagement force to the clutch assembly.

While many on-demand clutch control systems similar to those described above are currently used in four-wheel drive vehicles, a need exists to advance the technology and address recognized system limitations. For example, the size and weight of the friction clutch components and the electrical power requirements of the clutch actuator needed to provide the large clutch engagement loads may make such system cost prohibitive in some four-wheel drive vehicle applications. In an effort to address these concerns, new technologies are being considered for use in power-operated clutch actuator applications.

SUMMARY OF THE INVENTION

Thus, its is an object of the present invention to provide a power transmission device for use in a motor vehicle having a torque transfer mechanism equipped with a power-operated clutch actuator that is operable to control engagement of a multi-plate clutch assembly.

As a related object, the torque transfer mechanism of the present invention is well-suited for use in motor vehicle driveline applications to control the transfer of drive torque between a first rotary member and a second rotary member.

According to a preferred embodiment of the present invention, a torque transfer mechanism and control system are disclosed for adaptively controlling transfer of drive torque from a first rotary member to a second rotary member in a power transmission device of the type used in motor vehicle driveline applications. The torque transfer mechanism includes a multi-plate friction clutch assembly operably disposed between the first and second rotary members, and a clutch actuator assembly for generating a clutch engagement force to be exerted on the clutch assembly. The clutch actuator assembly includes an electric motor/brake unit, a torque/force conversion mechanism and a force amplification mechanism. The electric motor/brake unit can be switched by the control system between a motor mode and a brake mode for generating an output torque that is converted by the torque/force conversion mechanism into an axially-directed thrust force. Thereafter, thrust force is amplified by the force amplification mechanism to define the clutch engagement force.

According to the present invention, the control system operates the motor/brake unit in its motor mode when the speed of one of the rotary members is less than a predetermined threshold speed value so as to drive a rotor of the motor/brake unit which causes axial movement of an output member of the torque/force conversion mechanism. The control system switches the motor/brake unit into its brake mode when the rotary speed exceeds the threshold speed value so as to apply a dynamic brake torque to the rotor for controlling axial movement of the output member of the torque/force conversion mechanism. The present invention provides a clutch actuator assembly utilizing a low torque motor which acts as a generator during the brake mode so as to significantly reduce the electrical power requirement needed to adaptively control torque transfer through the clutch assembly.

The torque transfer mechanism of the present invention is adapted for use in a power transmission device for adaptively controlling the drive torque transferred between a primary driveline and a secondary driveline. According to a preferred application, the power transmission device of the present invention is a transfer case with the torque transfer mechanism arranged as a torque transfer coupling for providing on-demand torque transfer from the primary driveline to the secondary driveline. In a related application, the torque transfer mechanism is arranged as a torque bias coupling for varying the torque distribution and limiting interaxle slip between the primary and secondary driveline. According to another preferred application, the power transmission device is a drive axle assembly with the torque transfer mechanism arranged as a torque bias coupling to control speed differentiation and torque distribution across a differential unit.

BRIEF DESCRIPTION OF THE DRAWINGS

Further objects, features and advantages of the present invention will become apparent to those skilled in the art from analysis of the following written description, the appended claims, and accompanying drawings in which:

DETAILED DESCRIPTION OF THE PREFERRED EMBODIMENTS

The present invention is directed to a torque transfer mechanism that can be adaptively controlled for modulating the torque transferred from a first rotary member to a second rotary member. The torque transfer mechanism finds particular application in power transmission devices for use in motor vehicle drivelines such as, for example, an on-demand transfer clutch in a transfer case or an in-line torque coupling, a biasing clutch associated with a differential assembly in a transfer case or a drive axle assembly, or as a shift clutch in a multi-speed automatic transmission. Thus, while the present invention is hereinafter described in association with particular power transmission devices for use in specific driveline applications, it will be understood that the arrangements shown and described are merely intended to illustrate embodiments of the present invention.

Figure 1:
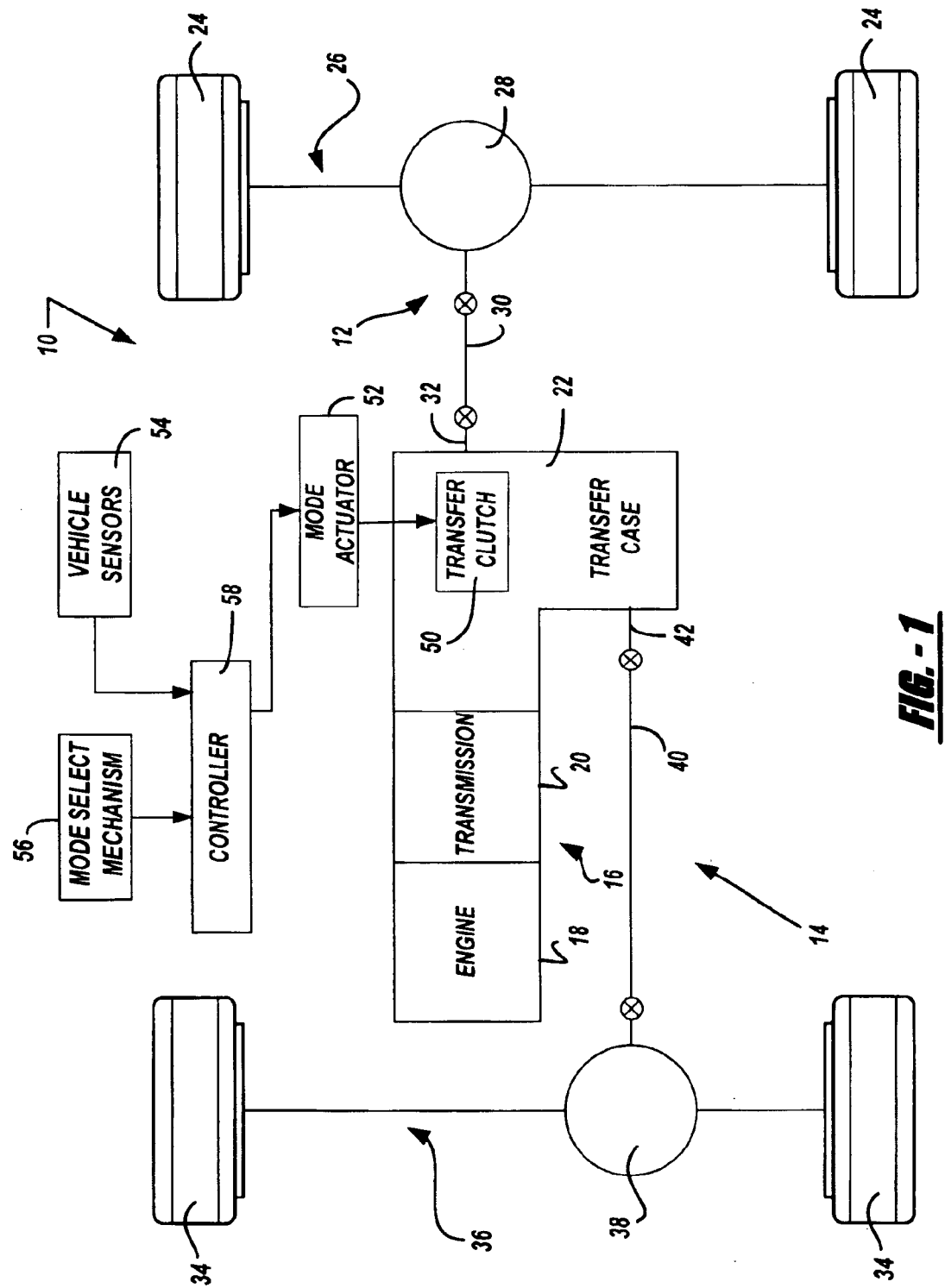
FIG. 1 illustrates the drivetrain of a four-wheel drive vehicle equipped with the power transmission device of the present invention.

With particular reference to FIG. 1 of the drawings, a drivetrain 10 for a four-wheel drive vehicle is shown. Drivetrain 10 includes a primary driveline 12, a secondary driveline 14, and a powertrain 16 for delivering rotary tractive power (i.e., drive torque) to the drivelines. In the particular arrangement shown, primary driveline 12 is the rear driveline while secondary driveline 14 is the front driveline. Powertrain 16 includes an engine 18, a multi-speed transmission 20, and a power transmission device hereinafter referred to as transfer case 22. Rear driveline 12 includes a pair of rear wheels 24 connected at opposite ends of a rear axle assembly 26 having a rear differential 28 coupled to one end of a rear prop shaft 30, the opposite end of which is coupled to a rear output shaft 32 of transfer case 22. Likewise, front driveline 14 includes a pair of front wheels 34 connected at opposite ends of a front axle assembly 36 having a front differential 38 coupled to one end of a front prop shaft 40, the opposite end of which is coupled to a front output shaft 42 of transfer case 22.

With continued reference to the drawings, drivetrain 10 is shown to further include an electronically-controlled power transfer system for permitting a vehicle operator to select between a two-wheel drive mode, a locked ("part-time") four-wheel drive mode, and an adaptive ("on-demand") four-wheel drive mode. In this regard, transfer case 22 is equipped with a transfer clutch 50 that can be selectively actuated for transferring drive torque from rear output shaft 32 to front output shaft 42 for establishing both of the part-time and on-demand four-wheel drive modes. The power transfer system further includes a power-operated mode actuator 52 for actuating transfer clutch 50, vehicle sensors 54 for detecting certain dynamic and operational characteristics of the motor vehicle, a mode select mechanism 56 for permitting the vehicle operator to select one of the available drive modes, and a controller 58 for controlling actuation of mode actuator 52 in response to input signals from vehicle sensors 54 and mode selector 56.

Figure 2:
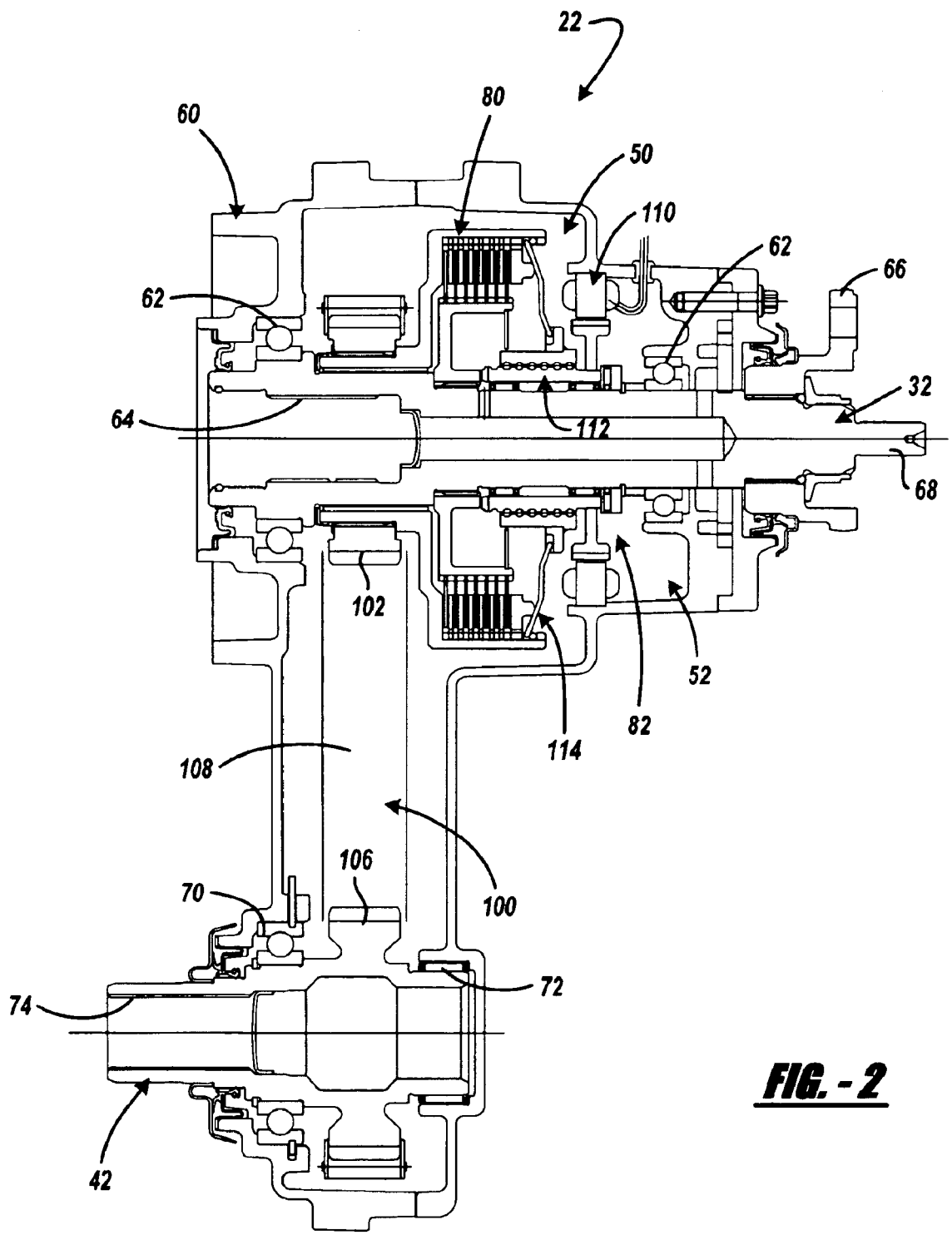
FIG. 2 is a sectional view of a transfer case associated with the drivetrain shown in FIG. 1 and which is equipped with a torque transfer mechanism according to a first embodiment of the present invention.

Transfer case 22 is shown in FIG. 2 to include a multi-piece housing 60 from which rear output shaft 32 is rotatably supported by a pair of laterally-spaced bearing assemblies 62. Rear output shaft 32 includes an internally-splined first end segment 64 adapted for connection to the output shaft of transmission 20 and a yoke assembly 66 secured to its second end segment 68 that is adapted for connection to rear propshaft 30. Front output shaft 42 is likewise rotatably supported from housing 60 by a pair of laterally-spaced bearing assemblies 70 and 72 and includes an internally-splined end segment 74 that is adapted for connection to front propshaft 40.

Transfer clutch 50 is a multi-plate friction clutch assembly 80 and mode actuator 52 is a power-operated clutch actuator assembly 82 which together define a torque transfer mechanism according to a preferred embodiment of the present invention. Friction clutch assembly 80 includes a hub 84 fixed via a spline connection 86 to rear output shaft 32, a drum 88, and a multi-plate clutch pack 90 that is operably disposed between hub 84 and drum 88. Clutch pack 90 includes a set of outer clutch plates 92 splined for rotation with drum 88 and which are interleaved with a set of inner clutch plates 94 splined for rotation with hub 84. Clutch assembly 80 further includes a pressure plate 96 that is splined for rotation with drum 88 and which has an annular rim flange 98 formed thereon. Pressure plate 96 is operably arranged to rotate with, and move axially relative to, drum 88 for exerting a compressive clutch engagement force on clutch pack 90. Such engagement of clutch pack 90 causes rotary power ("drive torque") to be transferred from rear output shaft 32 to front output shaft 42 via a transfer assembly 100. Transfer assembly 100 includes a first sprocket 102 fixed via a spline connection 104 for rotation with drum 88, a second sprocket 106 fixed for rotation with front output shaft 42, and a power chain 108 encircling sprockets 102 and 106. First sprocket 102 is shown fixed to a tubular stub shaft segment 89 of drum 88 which is rotatably supported on rear output shaft 32 via a suitable bearing assembly such as sleeve bushing 109.

As will be detailed, clutch actuator assembly 82 is operable for controlling axial movement of pressure plate 96 and thus, the magnitude of the clutch engagement force applied to clutch pack 90. In particular, pressure plate 96 is axially moveable relative to clutch pack 90 between a first or "released" position and a second or "locked" position. With pressure plate 96 in its released position, a minimum clutch engagement force is exerted on clutch pack 90 such that virtually no drive torque is transferred from rear output shaft 32 through clutch assembly 80 and transfer assembly 100 to front output shaft 42, thereby establishing the two-wheel drive mode. In contrast, movement of pressure plate 96 to its locked position causes a maximum clutch engagement force to be applied to clutch pack 90 such that front output shaft 42 is, in effect, coupled for common rotation with rear output shaft 32, thereby establishing the part-time four-wheel drive mode. Accordingly, control of the position of pressure plate 96 between its released and locked positions permits adaptive regulation of the amount of drive torque transferred from rear output shaft 32 to front output shaft 42, thereby establishing the on-demand four-wheel drive mode.

To provide means for moving pressure plate 96 between its released and locked positions, clutch actuator assembly 82 is shown to generally include an electric motor/brake unit 110, a torque/force conversion mechanism 112, and force amplification mechanism 114. Motor/brake unit 110 is an annular assembly which includes a stator 116 and a rotor 120. Stator 116 is shown to be non-rotationally secured to housing 60 and includes sets of windings, referred to as coil 118, which has its electrical lead wires 122 extending out of housing 60 via a sealed plug hole 124. Rotor 120 includes a plate segment 126 and an annular rim segment 128. As will be detailed, plate segment 126 of rotor 120 is fixed for rotation with a first component of torque/force conversion mechanism 112. As seen, rim segment 128 of rotor 120 has a plurality of permanent magnets 130 secured thereto which are arranged in close proximity to the field windings of coil 118. The annular configuration of motor/brake unit 110 permits simple assembly in concentric relation to rear output shaft 32 within housing 60. In addition, the packaging of motor/brake unit 110 inside housing 60 is advantageous in comparison to externally-mounted electric motor-type clutch actuators that are exposed to the hostile road and weather conditions associated with power transmission devices in motor vehicles.

Figure 3:
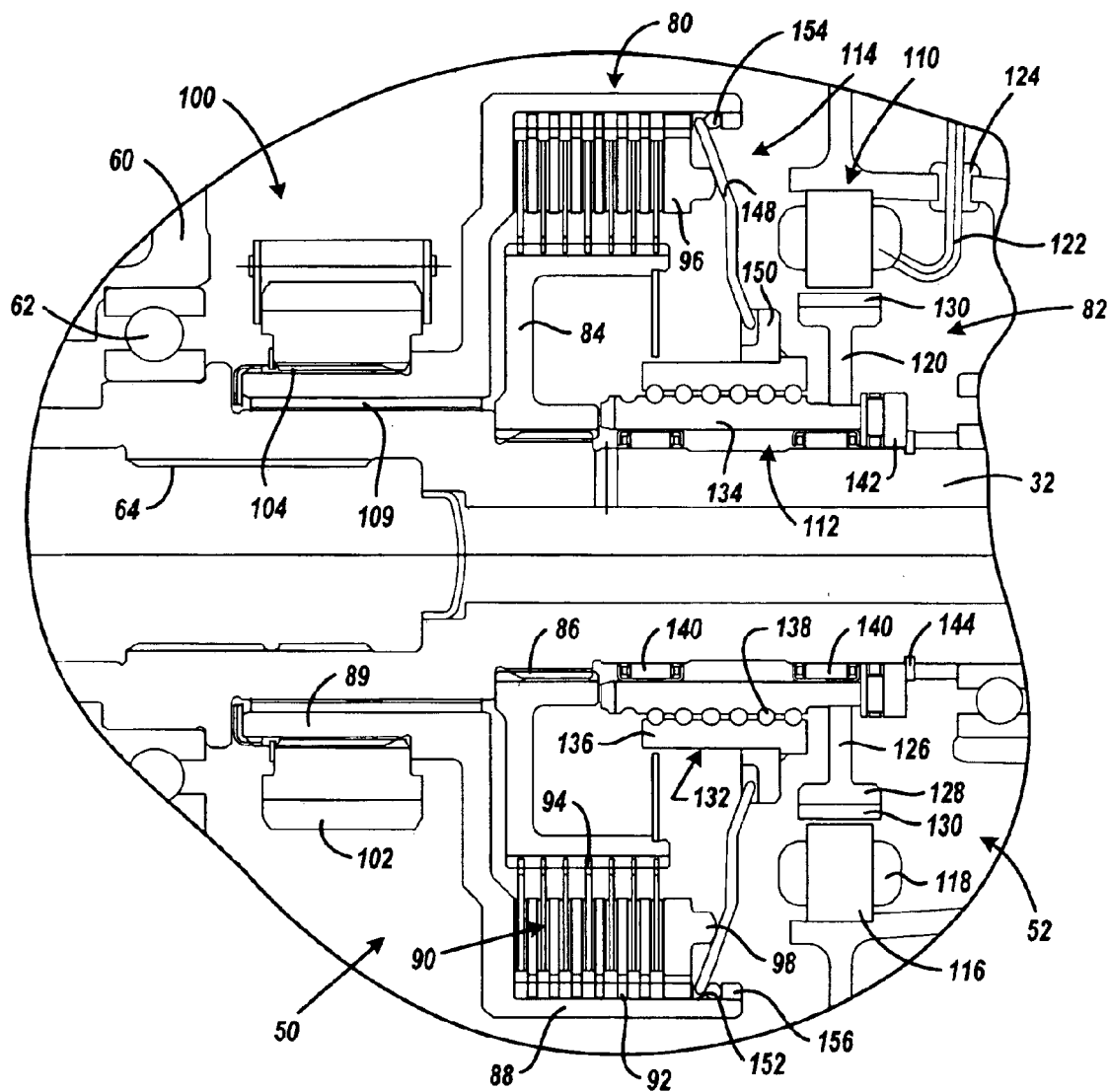
FIG. 3 is an enlarged partial view taken from FIG. 2 showing components of the torque transfer mechanism is greater detail.

Torque/force conversion mechanism 112 is shown in FIGS. 2 and 3 as a ball screw operator 132 having an externally-threaded screw 134, an internally-threaded nut 136, and balls 138 disposed in the aligned threads therebetween. Screw 134 is rotatably supported on rear output shaft 32 via a pair of needle bearing assemblies 140. Screw 134 is located and axially restrained between hub 84 and a thrust bearing assembly 142 via a snap ring 144. As seen, plate segment 126 of rotor 120 is fixed (i.e., welded, splined, etc.) for rotation with screw 134. Ball screw operator 132 is operable to cause axial movement of nut 136 relative to screw 134 in response to relative rotation therebetween. In this manner, the torque outputted from motor/brake unit 110 is converted into an axially-directed thrust force. This axially-directed thrust force is amplified and subsequently transferred to pressure plate 96 via force amplification mechanism 114. In some clutch applications, it may be possible to eliminate force amplification mechanism 114 and apply the thrust force outputted from ball screw operator 132 to pressure plate 96.

Force amplification mechanism 114 is shown to include a disk-type spring plate, such as a belleville spring 148, having a first end restrained against an annular retainer 150 fixed to nut 136 and a second end restrained in a circumferential groove 152 formed in drum 88. Preferably, belleville spring 148 has lugs at its outer peripheral edge that are coupled to drum 88 and lugs at its inner peripheral edge that are coupled to retainer 150. As such, belleville spring 148 couples nut 136 of ball screw operator 132 for common rotation with drum 88. In operation, when no torque is applied to rotor 120, screw 134 and nut 136 rotate together in response to rotation of drum 88.

To provide the desired force amplification characteristic, belleville spring 148 acts as a lever arm with an intermediate portion engaging rim flange 98 on pressure plate 96. A resilient ring 154 is retained in groove 152 between the outer end of belleville spring 148 and a reaction flange 156 that extends from drum 88. As is known, forward travel (i.e., to the left in FIG. 3) of nut 136 causes spring 148 to amplify the magnitude of the longitudinally-directed thrust force generated by ball screw operator 132 and apply the resultant clutch engagement force on pressure plate 96. The use of ball screw operator 132 in combination with disk spring 148 permits use of a low torque motor/brake unit 110. In operation, motor/brake unit 110 will be controlled in either of a first ("motor") mode or a second ("brake") mode for controlling the torque applied to rotor 120 so as to control relative rotation between screw 134 and nut 136, thereby controlling the magnitude of the clutch engagement force applied by pressure plate 96 on clutch pack 90.

Compared to conventional electrically-operated clutch actuator systems, the present invention provides significant operational advantages. For instance, clutch actuator assembly 82 requires only minimal electric power from the vehicle's host electrical supply system since, throughout most of its typical duty cycle, motor/brake unit 110 functions in its brake mode and acts as an absorber/generator for generating electrical power that can be dissipated or used to power one or more auxiliary electric devices such as, for example, an electric lube pump. Specifically, when the rotary speed of rear output shaft 32 is below a predefined threshold value, motor/brake unit 110 operates in its motor mode wherein coil 118 must be energized via an electrical control signal from controller 58 to drive rotor 120 in the appropriate rotary direction and through a desired amount of angular travel. Such controlled rotation of rotor 120 causes nut 136 of ball screw operator 132 to move axially relative to screw 134 in a corresponding direction and through a desired length of travel, thereby varying the magnitude of the clutch engagement force applied to clutch pack 90. The predefined threshold rotary speed value is preferably, but not limited to, about 150 rpm which equates to a vehicle rolling speed of about 5 mph. Thus, the torque transfer mechanism of the present invention only uses motor/brake unit 110 in its motor mode to control torque transfer requirements during low speed situations. For example, motor/brake unit 110 operates in its motor mode to control the transfer of drive torque to front output shaft 42 during a quick start or acceleration situation to avoid traction loss of rear wheels 24.

Once the rotary speed of rear output shaft 32 exceeds the predefined threshold value, the control system switches functions such that motor/brake unit 110 operates in its brake mode as an electric brake (absorber/generator) for creating (regenerating) electric power. In particular, when the rotary speed of rear output shaft 32 is above the threshold value, rotation of rotor 120 (caused by rotation of ball screw operator 132) causes magnets 130 to generate a voltage in the field windings of coil 118. However, since coil 118 is not energized, no torque is applied to rotor 120. As such, ball screw operator 132 continues to rotate as a unit and nut 136 does not move axially in either direction. Upon energization of coil 118, a brake torque is generated which acts to slow rotation of rotor 120 and thus slow rotation of screw 134 relative to nut 136, thereby causing axial travel of nut 136 relative to clutch pack 90. With motor/brake unit 110 operating in the brake mode, the control system functions to maintain a predetermined torque on ball screw operator 132 which, in turn, acts to control engagement of clutch pack 90 so as to generate the desired amount of torque transfer to front output shaft 42. Preferably, motor/brake unit 110 is a dc pemanetic magnetic device since it will not require a commutator or brushes.

In operation, when mode selector 56 indicates selection of the two-wheel drive mode, controller 58 signals electric motor/brake unit 110 to rotate screw 134 until nut 136 is located in a rearward or "retracted" position. Such action permits pressure plate 96 to move to its released position. If mode selector 56 thereafter indicates selection of the part-time four-wheel drive mode, coil 118 of electric motor/brake unit 110 is signaled by controller 58 to rotate screw 134 for axially advancing nut 136 until it is located in a forward or "extended" position. Such movement of nut 136 to its extended position acts to cause corresponding movement of pressure plate 96 to its locked position, thereby coupling front output shaft 42 to rear output shaft 32 through clutch assembly 80 and transfer assembly 100.

When mode selector 56 indicates selection of the on-demand four-wheel drive mode, controller 58 signals motor/brake unit 110 to rotate screw 134 until nut 136 is located in a "stand-by" position. This stand-by position may be its retracted position or, in the alternative, an intermediate position. In either case, a predetermined minimum amount of drive torque is delivered to front output shaft 42 through clutch assembly 80 which is considered to be in its "ready" condition. Thereafter, controller 58 determines when and how much drive torque needs to be transferred to front output shaft 42 based on the current tractive conditions and/or operating characteristics of the motor vehicle, as detected by sensors 54. Many control schemes are known in the art for determining a desired torque level to be transferred through a transfer clutch and adaptively controlling such actuation of the transfer clutch. In this regard, commonly owned U.S. Pat. No. 5,323,871 discloses a non-limiting example of a clutch control scheme and the various sensors used therewith, the entire disclosure of which is incorporated by reference.

Figure 4:
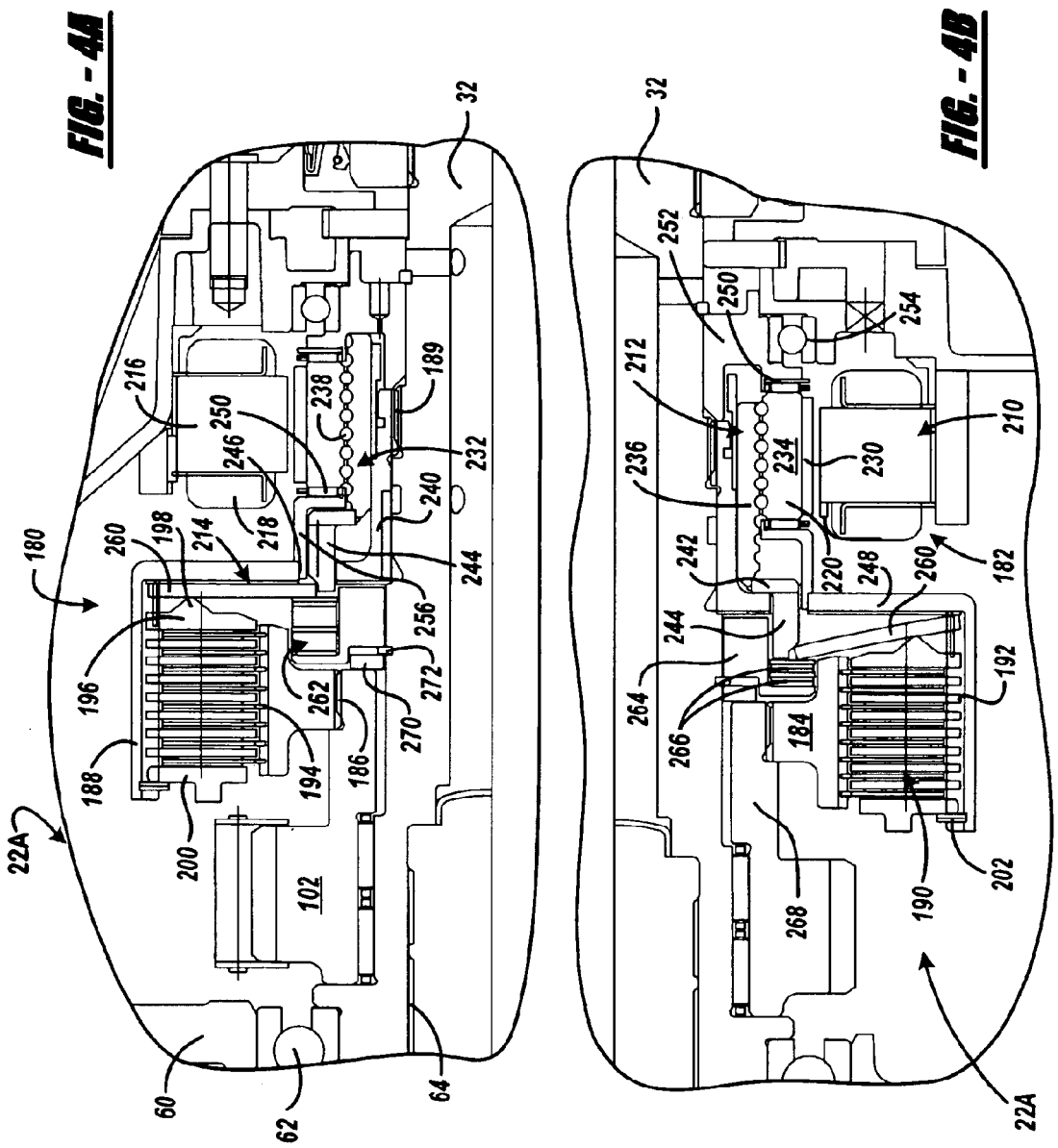
FIGS. 4A and 4B are partial sectional views of the transfer case equipped with a torque transfer mechanism according to a second embodiment of the present invention.

Referring now to FIGS. 4A and 4B, a modified version of transfer case 22 is identified by reference numeral 22A which includes a multi-plate clutch assembly 180 and a power-operated clutch actuator assembly 182 which together define a torque transfer mechanism according to another preferred embodiment of the present invention. Clutch assembly 180 includes a hub 184 fixed via a spline connection 186 to first sprocket 102, a drum 188 fixed via a spline connection 189 to rear output shaft 32, and a multi-plate clutch pack 190. Clutch pack 190 includes a set of outer clutch plates 192 splined for rotation with drum 188 which are alternatively interleaved with a set of inner clutch plates 194 that are splined for rotation with hub 184. Clutch assembly 180 further includes a pressure plate 196 that is splined for rotation with drum 188 and having an annular rim flange 198 formed thereon. A reaction plate 200 is splined to drum 188 and axially restrained thereon via a snap ring 202.

To provide means for moving pressure plate 196 between its released and locked positions, clutch actuator assembly 182 is generally shown to include an electric motor/brake unit 210, a torque/force conversion mechanism 212, and a force amplification mechanism 214. Motor/brake unit 210 includes an annular stator 216 that is secured to housing 60 and has a coil 218, and a rotor 220 having a plurality of permanent magnets 230 secured thereto in close proximity to coil 218.

Torque/force conversion mechanism 212 is a ball screw operator 232 having an internally-threaded nut 234, an externally threaded screw 236, and balls 238 disposed in the aligned threads therebetween. Screw 236 is supported on an annular hub segment 240 of drum 188. A drive plate 242 is secured to one end of screw 236 and has a series of circumferentially aligned axially-extending pins 244. Pins 244 pass through a series of commonly aligned throughbores 246 formed in a plate segment 248 of drum 188. Nut 234 is shown to be formed integrally with rotor 220 and axially restrained between a pair of thrust washer assemblies 250. One of the thrust washer assemblies 250 is disposed between a first end of nut 234 and a support plate 252 that is rotatably supported from housing via a bearing assembly 254. The other thrust washer assembly 250 is disposed between a second end of nut 234 and a cup-shaped retainer 256 that is secured to plate segment 248 of drum 188. Since drum 188 is driven by rear output shaft 32, the location of pins 244 within throughbores 246 causes screw 236 to likewise rotate in common with rear output shaft 32. As before, when no energy is applied/absorbed to drive/brake rotation of rotor 220, nut 234 rotates in unison with screw 236.

Ball screw operator 232 is operable to cause axial movement of screw 236 relative to nut 234 between its retracted and extended positions in response to relative rotation therebetween. The axially-directed thrust force generated by such axial movement of screw 234 is transferred from pins 244 to pressure plate 196 via force amplification mechanism 214. Force amplification mechanism 214 includes a series of disk levers 260 and having an outer end fixed via a spline connection to drum 188 and an inner end in engagement with the free end of pins 244. Levers 260 each have an intermediate portion engaging rim flange 198 on pressure plate 196. A return spring assembly 262 is disposed between hub 184 and disk levers 260 and includes a spring retainer 264 and a plurality of wave springs 266 disposed between a flange on spring retainer 264 and the inner end of disk levers 260 opposite pins 244. As seen, retainer 264 is located on rear output shaft 32 between an end of hub segment 268 of sprocket 102 by a thrust washer 270 and snap ring 272. Wave springs 266 are provided to bias disk levers 260 to a released position which, in turn, functions to bias screw 234 toward its retracted position.

The function and operation of motor/brake unit 210 is generally similar to that of motor/brake unit 110 in that energization of coil 218 in either of the motor or brake modes controls axial travel of screw 236 relative to nut 234. Screw 236 is moveable between retracted and extended positions relative to nut 234 for causing pins 244 to pivot levers 260 so as to move pressure plate 196 between its corresponding released and locked positions. By way of example, screw 236 is shown in FIG. 4A in its retracted position and in FIG. 4B in its extended position. Spring assembly 262 is arranged to normally bias screw 236 toward its retracted position. Again, only minimal electric power is required to precisely control engagement of clutch assembly 180 and thus, the drive torque transferred from rear output shaft 32 to front output shaft 42.

Figure 5:
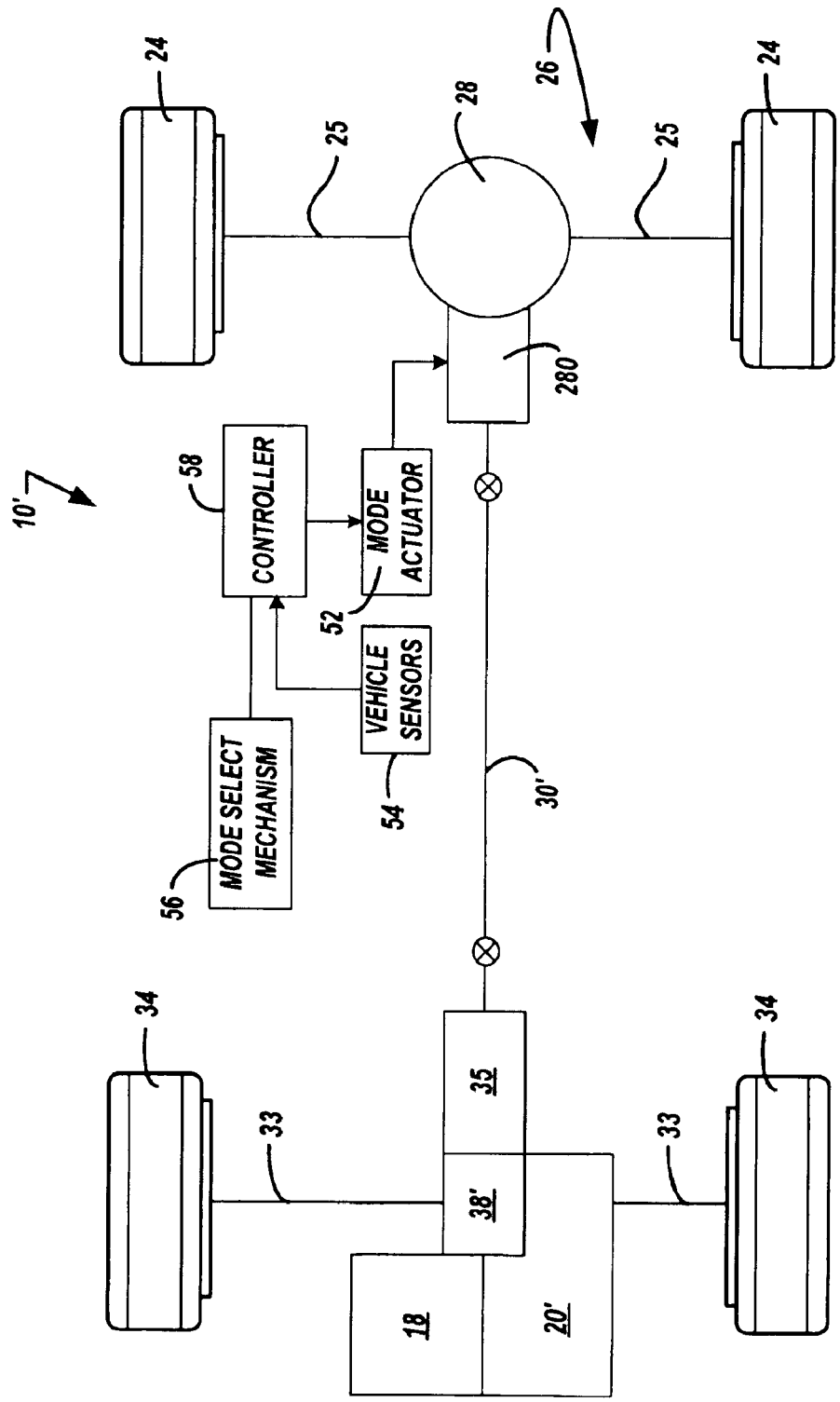
FIG. 5 is a schematic illustration of an alternative driveline for a four-wheel drive motor vehicle equipped with a power transmission device of the present invention.

To illustrate an alternative power transmission device to which the present invention is applicable, FIG. 5 schematically depicts a front-wheel based four-wheel drivetrain layout 10' for a motor vehicle. In particular, engine 18 drives a multi-speed transmission 20' having an integrated front differential unit 38' for driving front wheels 34 via axle shafts 33. A transfer unit 35 is also driven by transmission 20' for delivering drive torque to the input member of a torque transfer mechanism, such as an in-line torque coupling 280, via a drive shaft 30'. In particular, the input member of torque coupling 280 is coupled to drive shaft 30' while its output member is coupled to a drive component of rear differential 28 which, in turn, drives rear wheels 24 via axleshafts 25. Accordingly, when sensors 54 indicate the occurrence of a front wheel slip condition, controller 58 adaptively controls actuation of torque coupling 280 such that drive torque is delivered "on-demand" to rear wheels 24. It is contemplated that torque transfer coupling 280 would include a multi-plate clutch assembly and a clutch actuator assembly that are similar in structure and function to either of the torque transfer mechanisms previously described herein.

Figure 6:
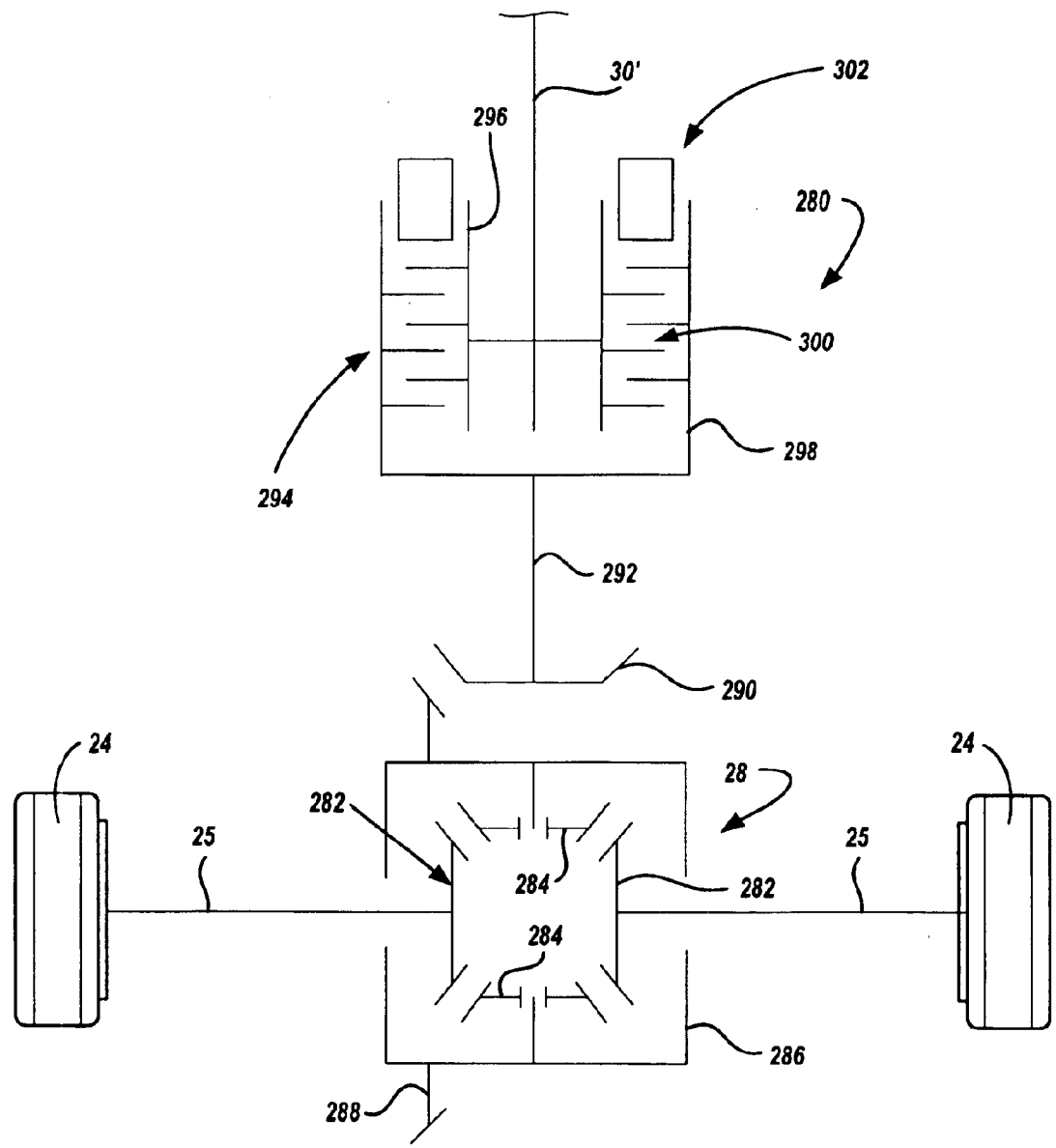
FIG. 6 is a schematic illustration of an in-line coupling associated with the drivetrain shown in FIG. 5 and equipped with a torque transfer mechanism according to the present invention.

Referring to FIG. 6, torque coupling 280 is schematically illustrated operably disposed between drive shaft 30' and rear differential 28. Rear differential 28 includes a pair of side gears 282 that are connected to rear wheels 24 via rear axle shafts 25. Differential 28 also includes pinions 284 that are rotatably supported on pinion shafts fixed to a carrier 286 and which mesh with side gears 282. A right-angled drive mechanism is associated with differential 28 and includes a ring gear 288 that is fixed for rotation with carrier 286 and meshed with a pinion gear 290 that is fixed for rotation with a pinion shaft 292.

Torque coupling 280 includes a mutli-plate clutch assembly 294 operably disposed between driveshaft 30' and pinion shaft 292 and which includes a hub 296 fixed for rotation with driveshaft 30', a drum 298 fixed for rotation with pinion shaft 282, and a clutch pack 300. Torque coupling 280 also includes a clutch actuator assembly 302 for controlling the magnitude of the clutch engagement force applied to clutch assembly 294 and thus the amount of drive torque transferred from drive shaft 30' to rear differential 28. According to the present invention, clutch actuator assembly 302 is contemplated to be similar to either of clutch actuator assemblies 82,182 in that an electric motor/brake unit controls translation of a ball screw operator which, in turn, controls engagement of the clutch pack 300.

Torque coupling 280 permits operation in any of the drive modes previously disclosed. For example, if the on-demand 4WD mode is selected, controller 58 regulates activation of clutch actuator 302 in response to the operating conditions detected by sensors 54 by controllably varying the electric control signal sent to the motor/brake unit. Selection of the part-time 4WD mode results in complete engagement of clutch pack 300 such that pinion shaft 292 is, in effect, rigidly coupled to driveshaft 30'. Finally, in the two-wheel drive mode, clutch pack 300 is released such that pinion shaft 292 is free to rotate relative to driveshaft 30'. Alternatively, elimination of mode select mechanism 56 would provide automatic on-demand operation of torque coupling 280 in a manner completely transparent to the vehicle operator.

Figure 7:
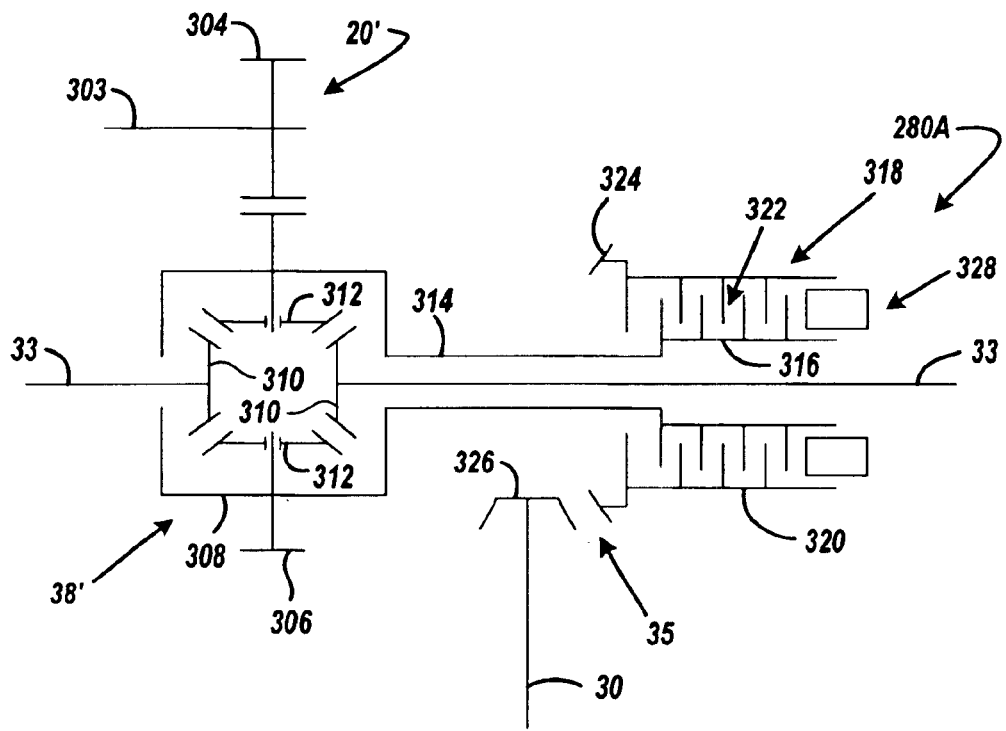
FIGS. 7 and 8 schematically illustrate power transmission devices for use in on-demand four-wheel drive vehicles equipped with a torque transfer mechanism according to the present invention.

Referring now to FIG. 7, torque coupling 280A is schematically illustrated in association with a power transmission device adapted for use with an on-demand four-wheel drive system based on a front-wheel drive vehicle similar to that shown in FIG. 5. Specifically, torque coupling 280 is shown operably associated with transfer unit 35 for transferring drive torque from transaxle 20' to drive shaft 30'. In this regard, an output shaft 303 of transaxle 20' is shown to drive an output gear 304 which, in turn, drives an input gear 306 that is fixed to a carrier 308 associated with front differential unit 38'. To provide drive torque to front wheels 34, front differential unit 38' includes a pair of side gears 310 that are connected to front wheels 34 via axleshafts 33. Differential unit 38' also includes a pair of pinions 312 that are rotatably supported on pinion shafts fixed to carrier 308 and which are meshed with side gears 310. A transfer shaft 314 is provided to transfer drive torque from carrier 308 to a clutch hub 316 associated with a multi-pate clutch assembly 318. Clutch assembly 318 further includes a drum 320 and a clutch pack 322 having interleaved inner and outer clutch plates respectively connected between hub 316 and drum 320.

Transfer unit 35 is a right-angled drive mechanism including a ring gear 324 fixed for rotation with drum 320 of clutch assembly 318 and which is meshed with a pinion gear 326 fixed for rotation with drive shaft 30. As seen, a clutch actuator assembly 328 is schematically illustrated for controlling actuation of clutch assembly 318. According to the present invention, clutch actuator assembly 328 is similar to one of clutch actuator assemblies 82,182 previously described in that an electric motor/brake unit controls translational movement of a ball screw operator which, in turn, controls engagement of clutch pack 322. In operation, drive torque is transferred from the primary (i.e., front) driveline to the secondary (i.e., rear) driveline in accordance with the particular mode selected by the vehicle operator via mode selector 56. For example, if the on-demand 4WD mode is selected, controller 58 regulates actuation of clutch actuator 328 in response to the vehicle operating conditions detected by sensors 54 by varying the electric signal sent to the electric motor/brake unit. In this manner, the level of clutch engagement and the amount of drive torque that is transferred through clutch pack 322 to the rear driveline through transfer unit 35 and drive shaft 30 is adaptively controlled. Selection of a locked or part-time 4WD mode results in full engagement of clutch assembly 318 for rigidly coupling the front driveline to the rear driveline. In some applications, the mode selector 56 may be eliminated such that only the on-demand 4WD mode is available so as to continuously provide adaptive traction control without input from the vehicle operator.

Figure 8:
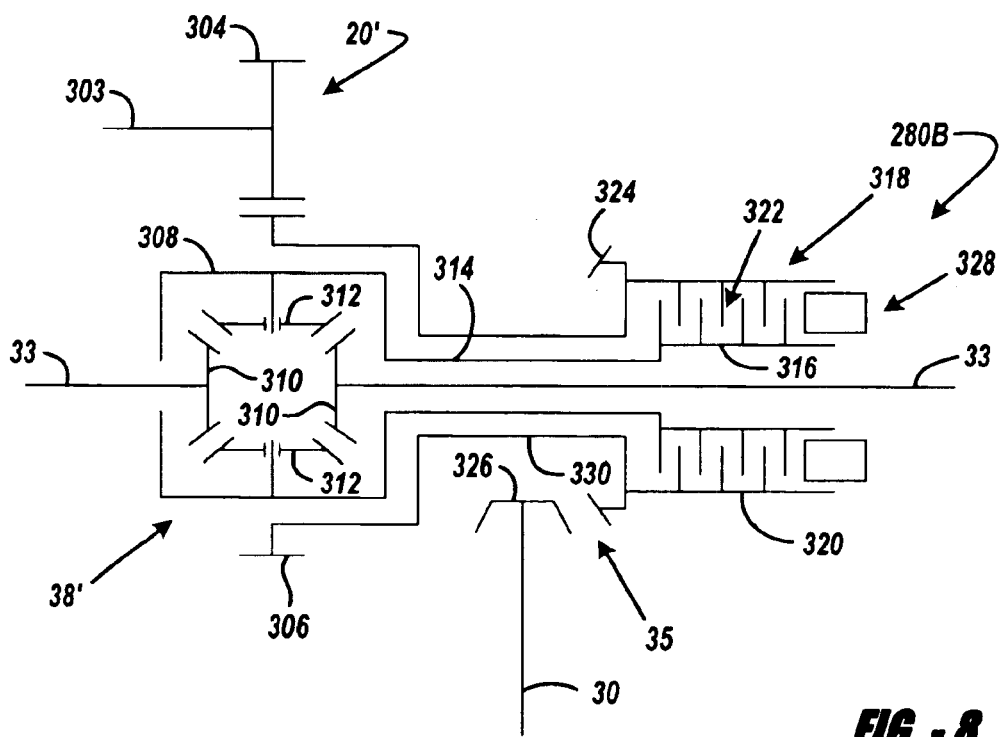

FIG. 8 illustrates a modified version of FIG. 7 wherein an on-demand four-wheel drive system is shown based on a rear-wheel drive motor vehicle that is arranged to normally deliver drive torque to rear wheels 24 while selectively transmitting drive torque to front wheels 34 through a torque coupling 280B. In this arrangement, drive torque is transmitted directly from transmission output shaft 303 to transfer unit 35 via an intermediate shaft 330 interconnecting input gear 306 to ring gear 324. Since ring gear 324 is driven by the output of transaxle 20', transfer unit 35 supplies drive torque to rear axle assembly 26 via driveshaft 30. To provide drive torque to front wheels 34, torque coupling 280B is shown operably disposed between intermediate shaft 330 and transfer shaft 314. In particular, clutch assembly 318 is arranged such that drum 320 is driven with ring gear 324 by intermediate shaft 330. As such, actuation of clutch actuator 328 functions to transfer drive torque from drum 320 through clutch pack 322 to hub 316 which, in turn, drives carrier 308 of front differential unit 38' via transfer shaft 314. Again, the vehicle could be equipped with mode selector 56 to permit selection by the vehicle operator of either the adaptively controlled on-demand 4WD mode or the locked part-time 4WD mode. In vehicles without mode selector 56, the on-demand 4WD mode is the only drive mode available and provides continuous adaptive traction control without input from the vehicle operator.

Figure 9:
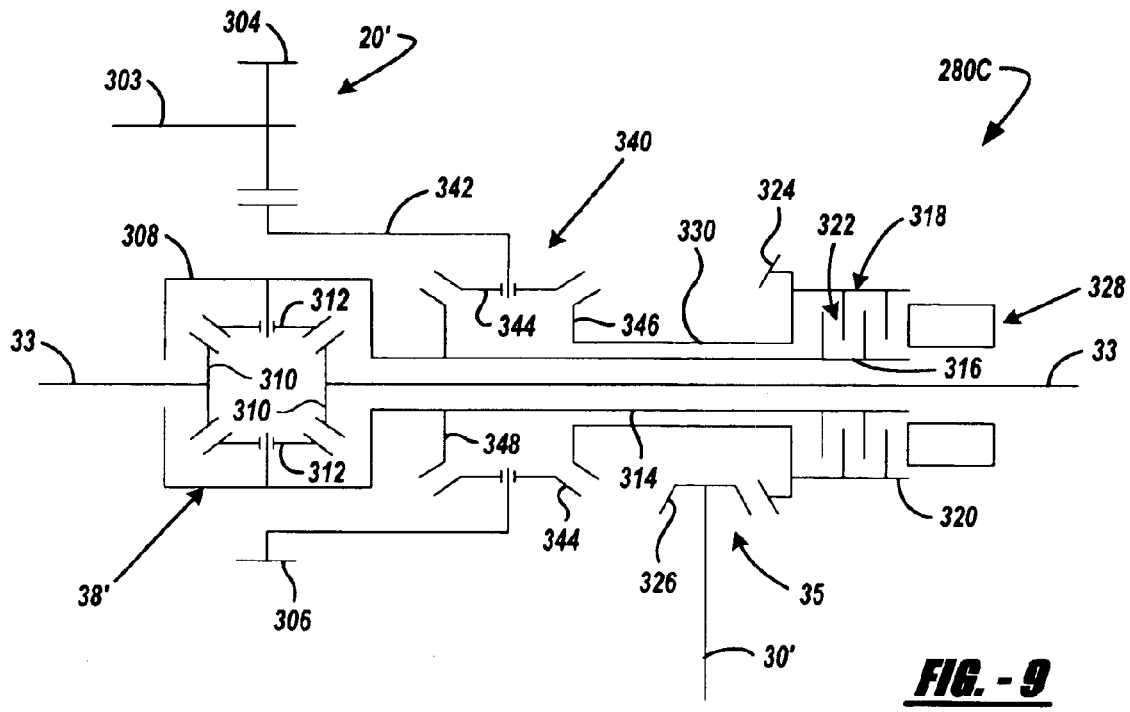
FIG. 9 shows a power transmission device for use in a full-time four-wheel drive vehicle which is equipped with a torque transfer mechanism according to the present invention.

In addition to the on-demand 4WD systems shown previously, the power transmission technology of the present invention can likewise be used in full-time 4WD systems to adaptively bias the torque distribution transmitted by a center or "interaxle" differential unit to the front and rear drivelines. For example, FIG. 9 schematically illustrates a full-time four-wheel drive system which is generally similar to the on-demand four-wheel drive system shown in FIG. 8 with the exception that an interaxle differential unit 340 is now operably installed between front differential unit 38' and transfer unit 35. In particular, output gear 306 is fixed for rotation with a carrier 342 of interaxle differential 340 from which pinion gears 344 are rotatably supported. A first side gear 346 is meshed with pinion gears 344 and is fixed for rotation with intermediate shaft 330 so as to be drivingly interconnected to the rear driveline through transfer unit 35. Likewise, a second side gear 348 is meshed with pinion gears 344 and is fixed for rotation with transfer shaft 314 and carrier 308 of front differential unit 38' so as to be drivingly interconnected to the front driveline.

A torque transfer mechanism, referred to as torque bias coupling 280C, is shown to be operably disposed between side gears 346 and 348. Torque bias coupling 280C is similar to torque transfer coupling 280B except that it is now operably arranged between the driven outputs of interaxle differential 340 for providing a torque biasing and slip limiting function. Torque bias coupling 280C is shown to include multi-plate clutch assembly 318 and clutch actuator 328. Clutch assembly 318 is operably arranged between transfer shaft 314 and intermediate shaft 330. In operation, when sensor 54 detects a vehicle operating condition, such as excessive interaxle slip, which requires adaptive traction control, controller 58 controls the electric motor/brake unit associated with clutch actuator 328 for controlling engagement of clutch assembly 318 and thus the torque biasing between the front and rear driveline.

Figure 10:
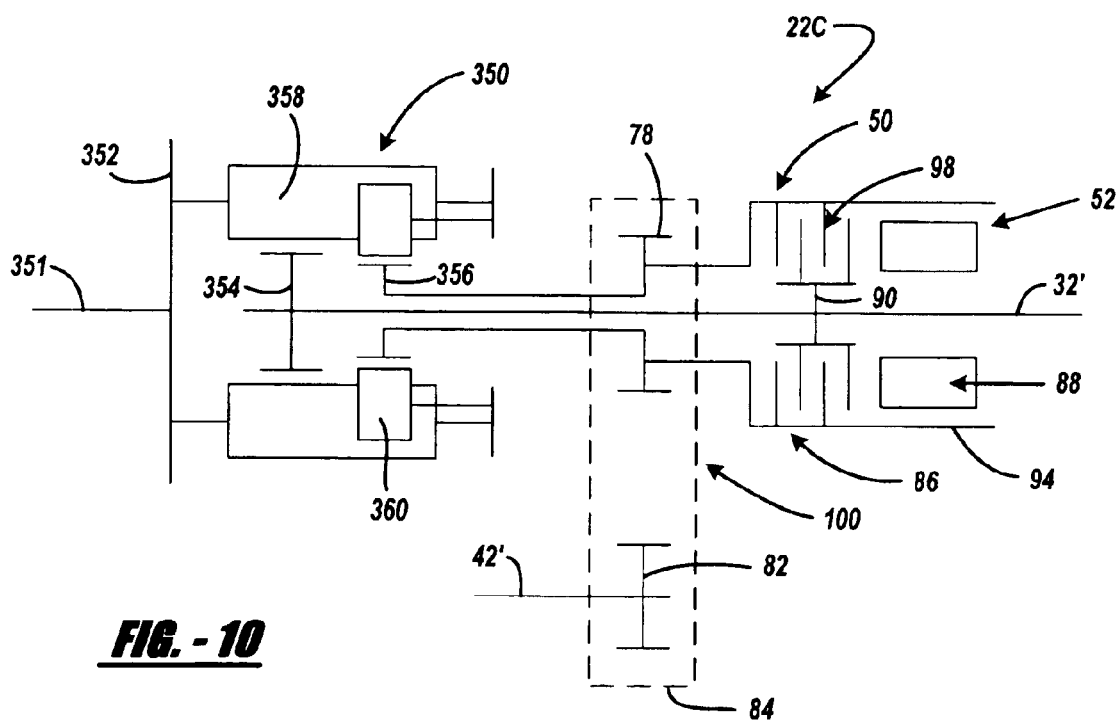
FIG. 10 illustrates a transfer case for use in a full-time four-wheel drive vehicle equipped with a torque transfer mechanism according to the present invention.

Referring now to FIG. 10, a full-time 4WD system is shown to include a transfer case 22C equipped with an interaxle differential 350 between an input shaft 351 and output shafts 32' and 42'. Differential 350 includes a rotary input member defined as a planet carrier 352, a first rotary output member defined as a first sun gear 354, a second rotary output member defined as a second sun gear 356, and a gearset for accommodating speed differentiation between first and second sun gears 354 and 356. The gearset includes meshed pairs of first planet gears 358 and second pinions 360 which are rotatably supported by carrier 352. First planet gears 358 are shown to mesh with first sun gear 354 while second planet gears 350 are meshed with second sun gear 356. First sun gear 354 is fixed for rotation with rear output shaft 32' so as to transmit drive torque to rear driveline 12. To transmit drive torque to front driveline 14, second sun gear 356 is coupled to transfer assembly 100 which includes a first sprocket 78 rotatably supported on rear output shaft 32', a second sprocket 82 fixed to front output shaft 42', and a power chain 84. Transfer case 22C further includes a torque biasing clutch 50 having a multi-plate clutch assembly 86 and a mode actuator 52 having a clutch actuator assembly 88. Clutch assembly 86 includes a drum 94 fixed for rotation with first sprocket 78, a hub 90 fixed for rotation with rear output shaft 32', and a multi-plate clutch pack 98 operably disposed therebetween. Clutch actuator assembly 88 is structurally and functionally similar to the clutch actuators previously described. If a mode select mechanism is available, transfer case 22C would permit operation in either of an adaptive full-time four-wheel drive mode or a locked four-wheel drive mode.

Figure 11:
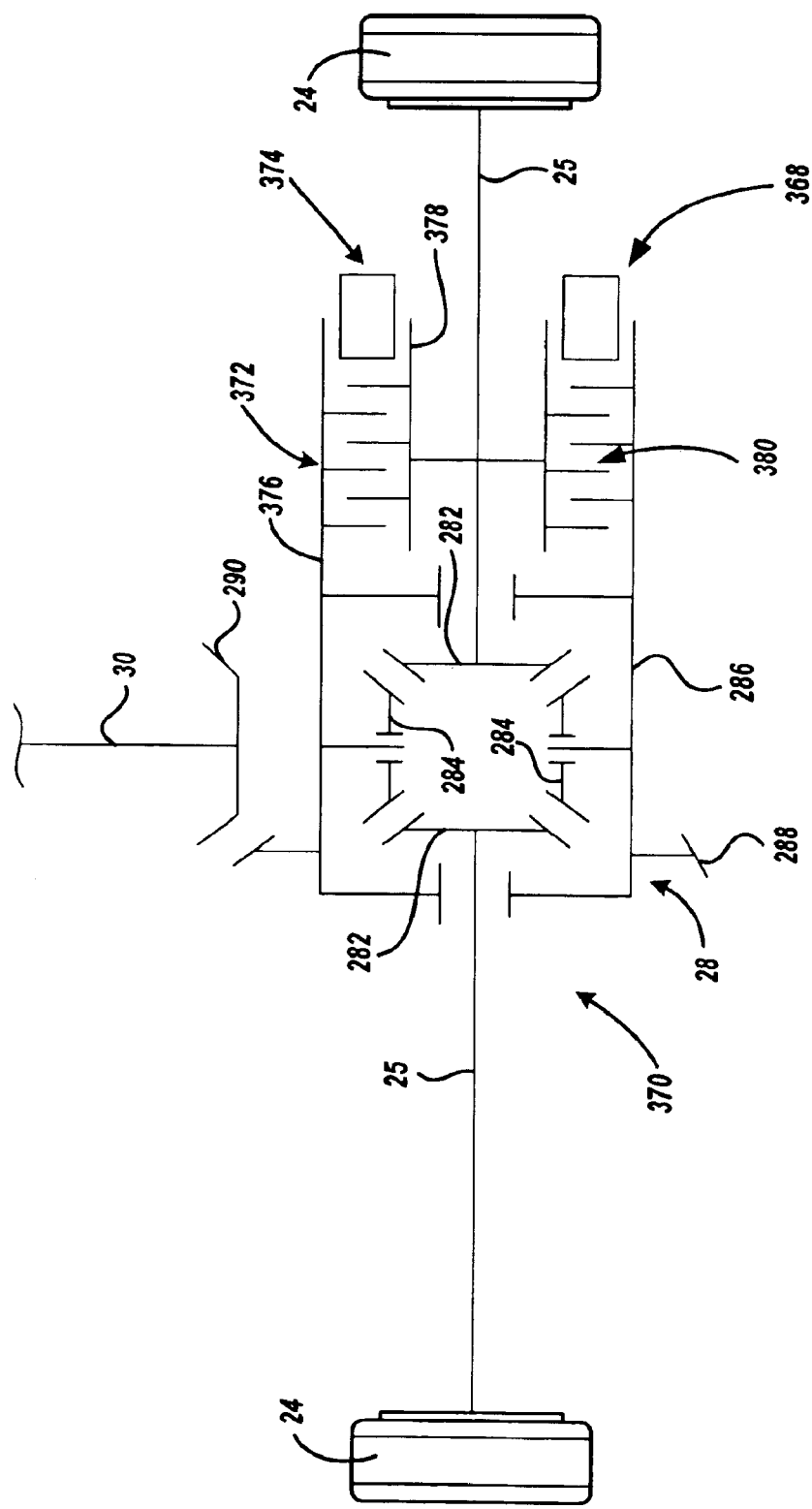
FIG. 11 shows a drive axle assembly equipped with a torque transfer mechanism of the present invention.

Referring now to FIG. 11, a drive axle assembly 370 is shown which is generally a modified version of rear axle assembly 26 and which incorporates a torque transfer mechanism in association with rear differential 28 so as to permit adaptive control of the torque biasing and intra-axle speed differentiation between rear wheels 24. The torque transfer mechanism is a torque bias coupling 368 shown to include a multi-plate clutch assembly 372 that is operably disposed between carrier 286 and one of axleshafts 25, and a clutch actuator assembly 374. Clutch assembly 372 includes a drum 376 fixed for rotation with carrier 286, a hub 378 fixed for rotation with one of axleshafts 25, and a clutch pack 380 disposed therebetween. Clutch actuator assembly 374 is operable for controlling the magnitude of a clutch engagement force applied to clutch pack 380 and thus, the torque biasing between the left and right wheels 24. Clutch actuator assembly 374 is similar to clutch actuators 82,182 and includes a motor/brake unit, a torque/force conversion mechanism and a force amplification mechanism.

Figure 12:
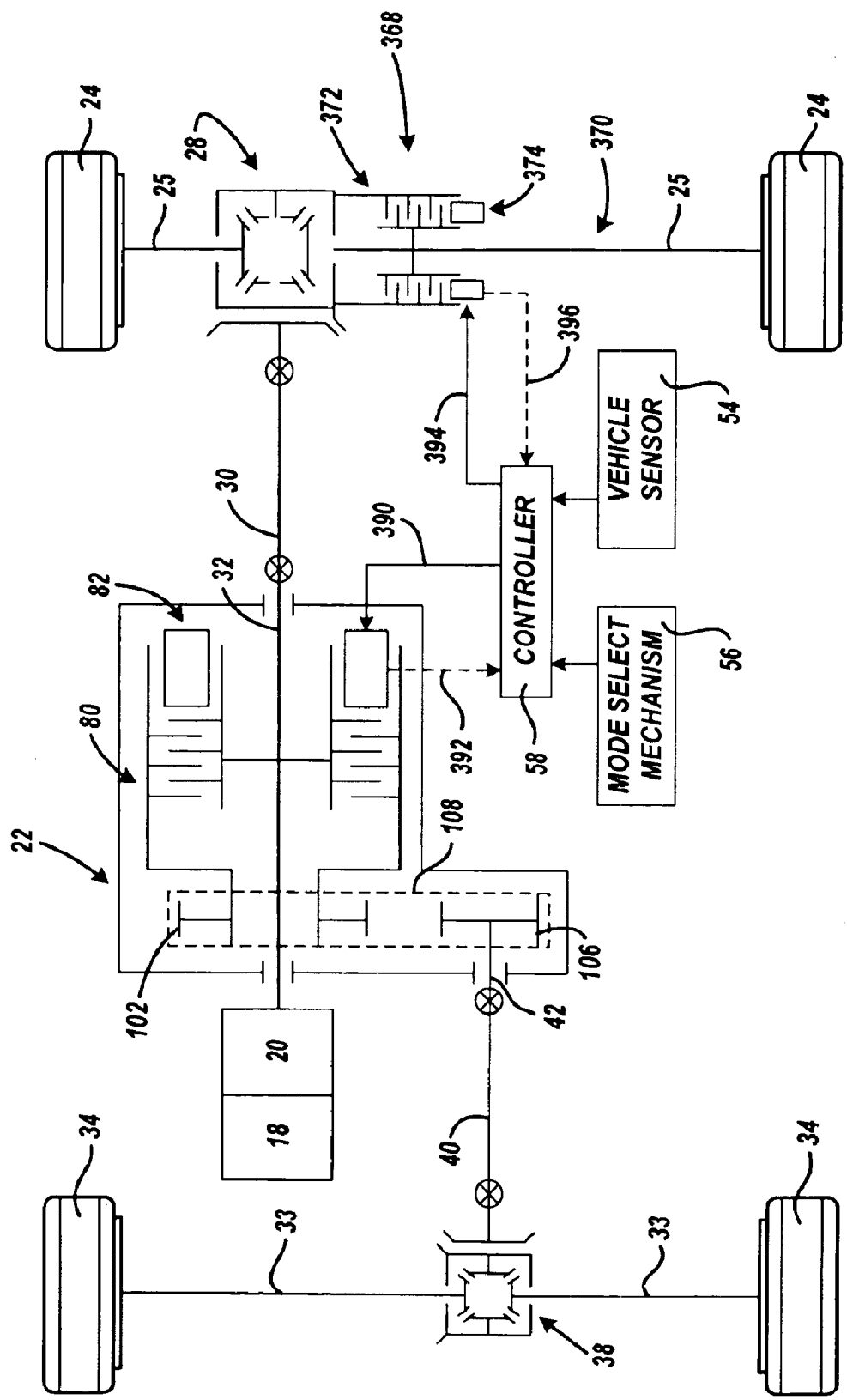
FIG. 12 is a schematic illustration of a drivetrain for a four-wheel drive vehicle incorporating two torque transfer mechanisms.
Figure 13:
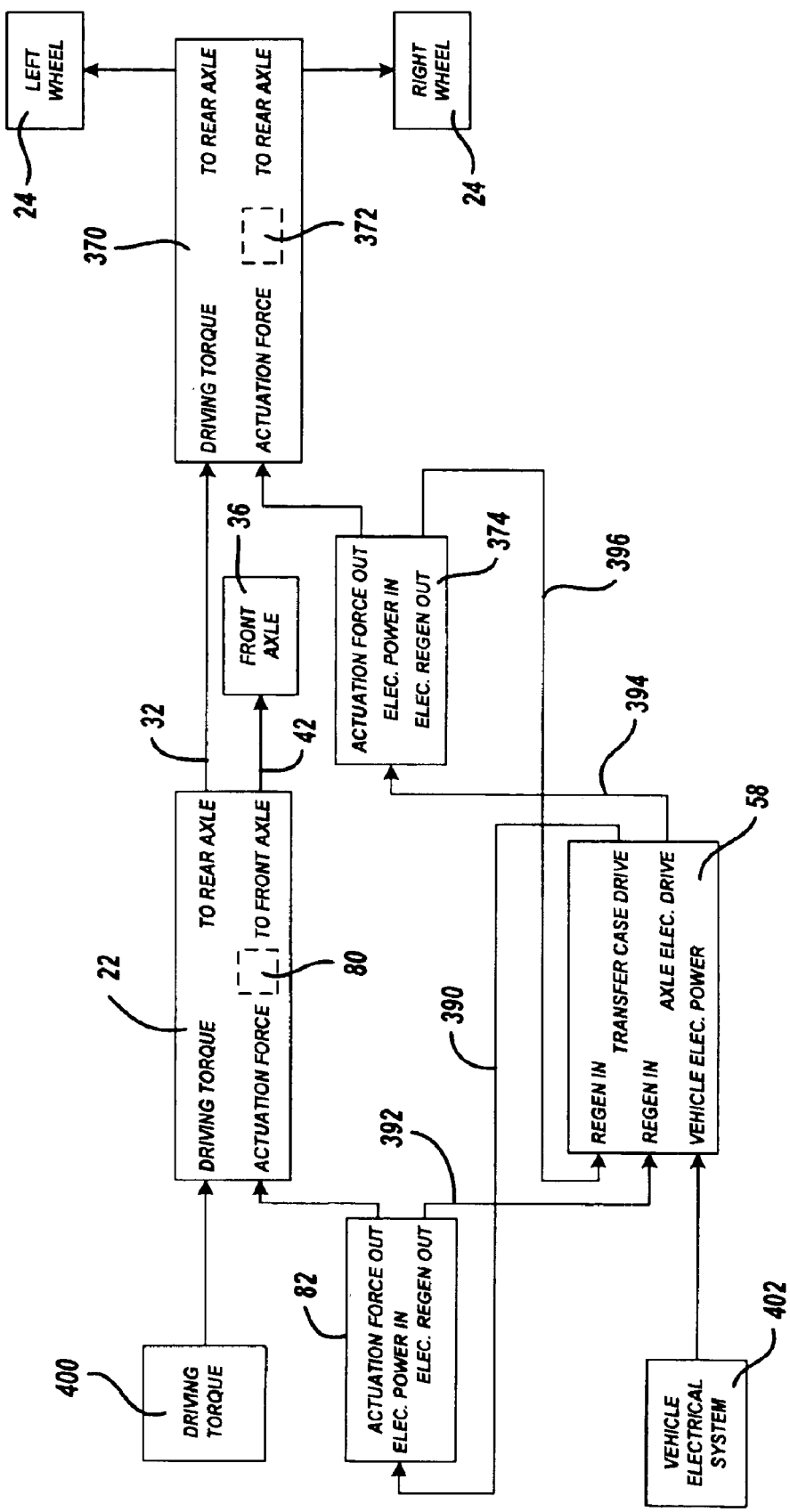
FIG. 13 is a block diagram of an electric power control system for the four-wheel drive vehicle shown in FIG. 12.

Drive axle assembly 370 can be used alone or in combination with other torque transfer mechanisms disclosed herein. In particular, drive axle assembly 370 can be associated with the primary axle in a rear wheel based on-demand 4WD drivetrain (FIGS. 1 and 8), a front wheel based on-demand 4WD drivetrain (FIGS. 5 and 7) or in either (or both) axles in full-time 4WD drivetrains (FIGS. 9 and 10). For example, FIG. 12 is a schematic illustration of drivetrain 10 from FIG. 1 with drive axle assembly 370 used in substitution for rear axle assembly 26. Electric power to clutch actuator assembly 82 of the torque transfer coupling in transfer case 22 is shown by power line 390 while regenerated electric power from clutch actuator assembly 82 is shown by dashed line 392. Similarly, electric power flow to clutch actuator assembly 374 of torque bias coupling 368 in drive axle assembly 370 is shown by power line 394 while regenerated electric power from clutch actuator assembly 374 is shown by dashed power line 396. Referring to FIG. 13, a block diagram is provided to better illustrate the electric power system associated with the drivetrain shown in FIG. 12. Block 400 indicates the drive torque supplied to transfer case 22 by engine 18 and transmission 20 while block 402 indicates the electric power delivered to controller 58 from the vehicle's host system. As noted, a unique aspect of the present invention is that power from the vehicle's host system is only required during operation of the motor/brake unit in the motor mode to drive the rotor and in the brake mode to energize the coil windings. However, it should be understood that the electric power regenerated during operation of one clutch actuator in its brake mode can be used by controller 58 to provide electric power the other clutch actuator.

Figure 14:
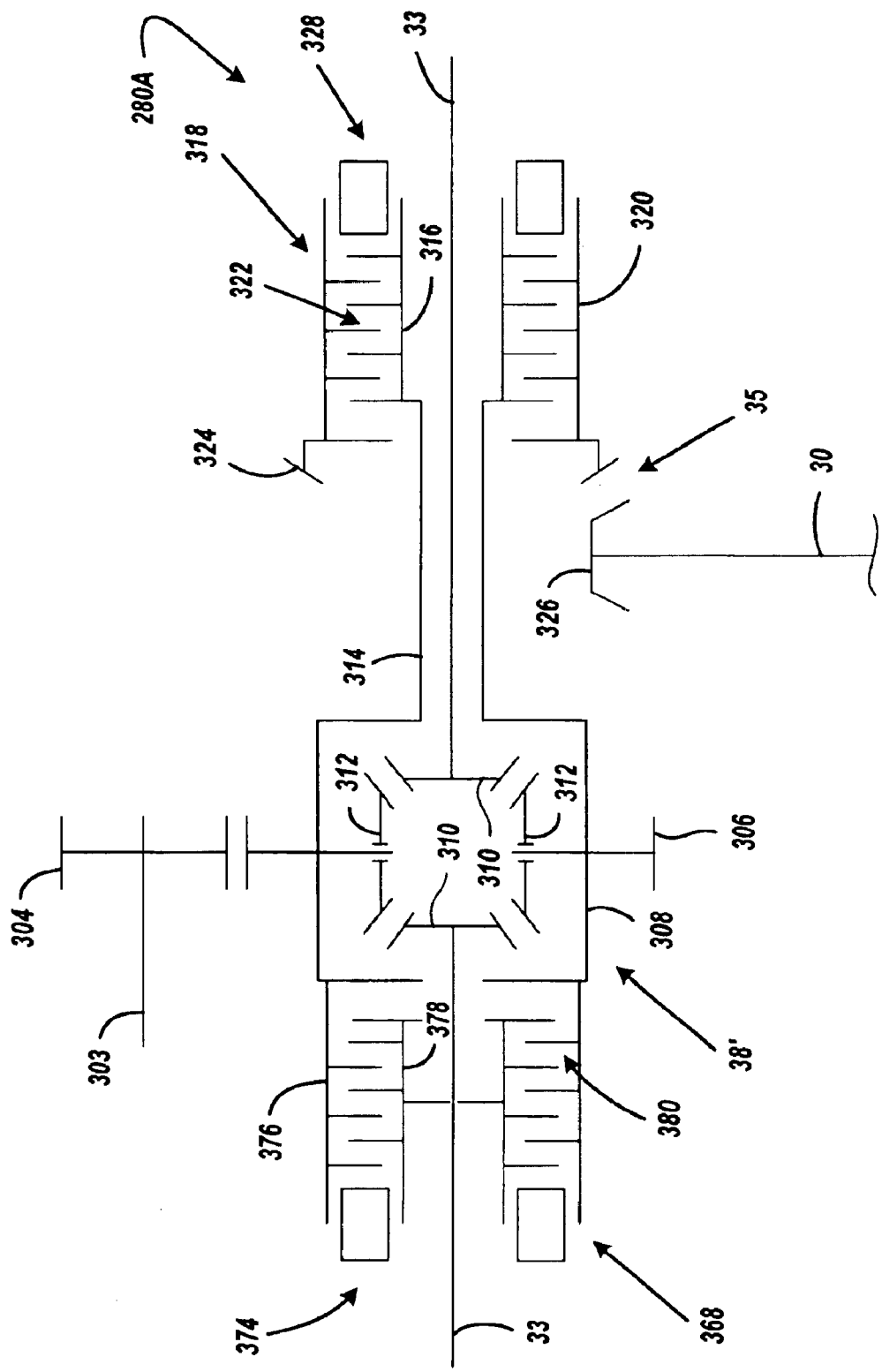
FIG. 14 is a schematic illustration of a drivetrain for a four-wheel drive vehicle according to the present invention.

The drivetrain shown in FIGS. 12 and 13 illustrate concurrent use and control of two distinct motor/brake units which are only minimally reliant on electric power from the vehicle's host electric system. A similar dual coupling arrangement using drive axle assembly 370 can be provided in association with the rear wheel based power transmission device shown in FIG. 8. In contrast, FIG. 14 is a modified version of the front wheel based power transmission device shown in FIG. 7 which now further incorporates torque bias coupling 368 in association with front differential 38'. In this arrangement, torque drive coupling 368 provides adaptive control of intra-axle differentiation between front wheels 34 while torque coupling 280A provides adaptive control of the drive torque transferred on-demand to the rear driveline. The power sharing arrangement shown in FIG. 13 would again be applicable for controlling the dual coupling powertrain of FIG. 14.

A control system for controlling operation of the motor/brake unit(s) will now be detailed. In general, the control system, and its associated algorithms, is employed to control a brushless dc motor-based clutch actuator assembly. The actuator assembly, in turn, permits modulated control of the torque outputted from its associated clutch assembly. The control system can receive a torque output command from a powertrain control module via a communications link. This command is translated into an electric current level for the brushless motor by the algorithms. A desired current level is maintained in the motor by a feedback control loop, either by sensing the actual motor current or by sensing the actual torque outputted by the clutch assembly. Commutation of the brushless motor drive is also performed by the controller. The motor position is relayed to the controller by the output state of three hall effect sensors embedded in the coil windings. The controller energizes the correct winding pair based on the output from the hall sensors and the desired direction of rotor rotation.

Figure 15:
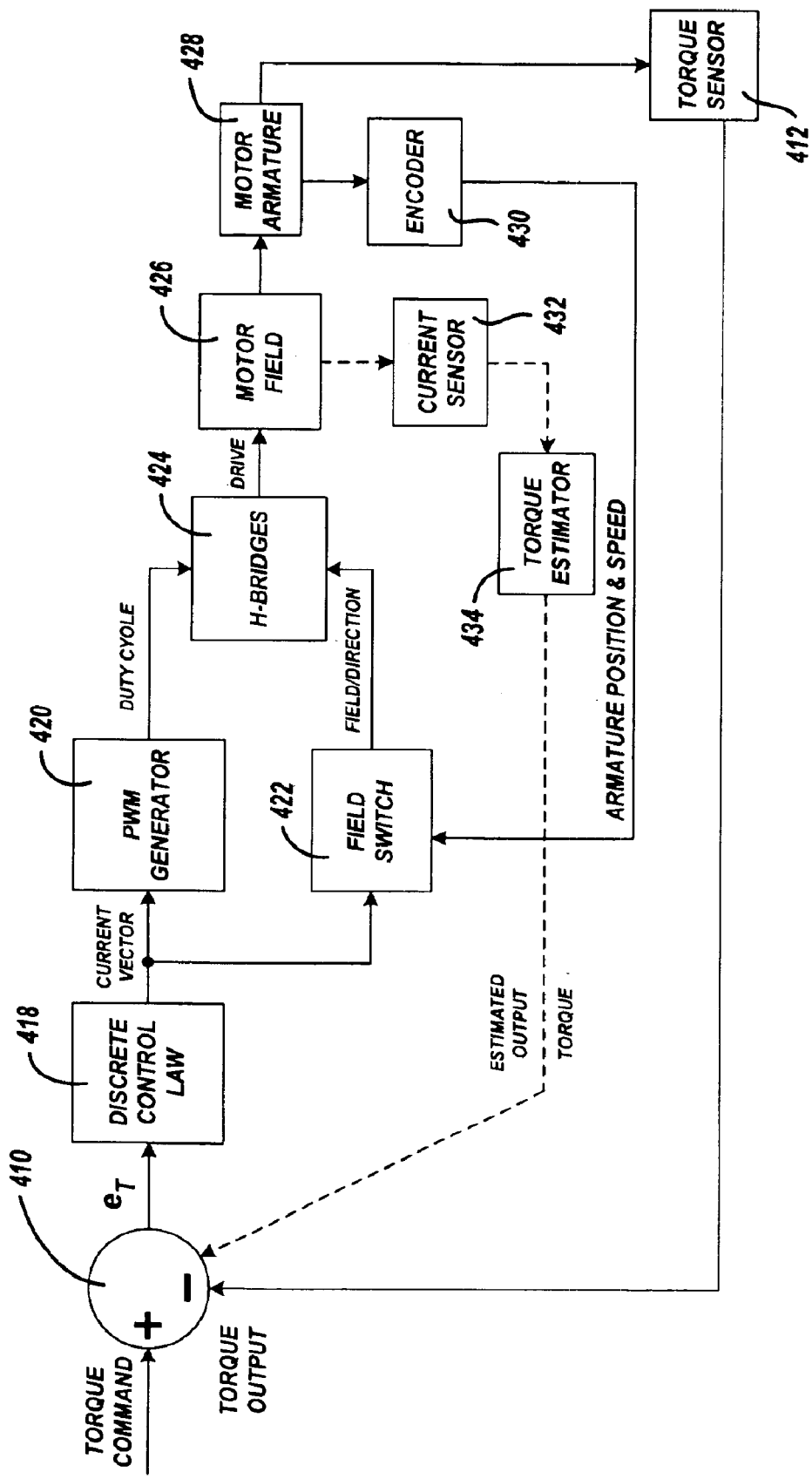
FIG. 15 is a block diagram of a control system for adaptive control of the torque transfer mechanisms of the present invention.

Referring to FIG. 15, an exemplary circuit for the control system is shown. The torque command from controller 58 is delivered to a summing function 410 where the torque command value is compared to the actual torque output value measured by a torque sensor 412 on the output of the clutch assembly. A discrete control law function 418 has as its input the torque error ($e_T$) value outputted from summing function 410. Discrete control law function 418 transforms the torque error ($e_T$) into a signal that commands the subsequent functions to compensate for the error. Specifically, the output signal of control law function 418 commands the magnitude and sign of the clutch engagement force. A PWM (pulse width modulation) generator 420 receives the output signal from discrete control law function 418 and outputs a directly proportional duty cycle pulse train that controls the magnitude of the electric current sent to the coil of motor/brake unit. A field switch 422 outputs binary signals that control the direction of rotation of the rotor of the motor/brake unit. These direction signals are dictated by the sign of the output signal from control law function 418. Hence, if the current vector is negative, the motor will turn one way, and if the current vector is positive, the motor will turn in the opposite direction. One direction of rotation acts to increase output torque, while the other reduces pressure on the clutch and thereby reduces the output torque.

An H-bridge circuit 424 is configured from four controlled switches (i.e., relay, transistor) that allows control of both the direction and magnitude of electric current through a load (i.e., motor). Two of the four switches are activated to direct current in a given direction. In addition, one of the two remaining devices is modulated so as to control the amount (magnitude) of current.

Motor field block 426 represents the coils and pole pieces of the windings associated with motor/brake units' field. Motor armature 428 is the rotating member of the motor (i.e., the rotor) that also carries the magnet pole pairs. An encoder 430 is a sensor that outputs a signal which identifies the position of the motor armature with respect to the field coils, as well as the speed and direction of motor rotation. This block is necessary for realizations where the motor is electrically commutated (i.e., brushless motors). As is obvious, torque sensor 412 outputs an electrical signal that is proportional to the torque applied to the device to which the sensor is attached. A current sensor 432 outputs an electrical signal that is proportional to the electrical current acting thereon. In the absence of a torque sensor, a torque estimator 434 can be employed to estimate the clutch output torque. It does so by operating mathematically on the current sensor's signal to provide an estimate of the output torque. In practice, this may be a simple linear relationship or a more complex function.

A number of preferred embodiments have been disclosed to provide those skilled in the art an understanding of the best mode currently contemplated for the operation and construction of the present invention. The invention being thus described, it will be obvious that various modifications can be made without departing from the true spirit and scope of the invention, and all such modifications as would be considered by those skilled in the art are intended to be included within the scope of the following claims.

What is claimed is:

1. A power transmission device for use in a motor vehicle having a powertrain and first and second drivelines, comprising:
   a first rotary member adapted to transmit drive torque from the powertrain to the first driveline;
   a second rotary member coupled to the second driveline;
   a torque transfer mechanism for transmitting drive torque from said first rotary member to said second rotary member and including a transfer clutch operably disposed between said first and second rotary members and a clutch actuator for controlling engagement of said transfer clutch, said clutch actuator including an operator unit operable to exert a clutch engagement force on said transfer clutch and an electric motor operable in a motor mode and a brake mode for generating an output torque that is converted by said operator unit into said clutch engagement force; and
   a control system for selectively switching said electric motor between its motor mode and its brake mode based on the rotary speed of one of said first and second rotary members.

2. The power transmission device of claim 1 wherein said control system provides electrical power to drive said motor when operating in its motor mode, and wherein said control system extracts electrical power to brake said motor when operating in its brake mode.

3. The power transmission device of claim 1 wherein said operator unit includes first and second components with said first component adapted to move axially in response to relative rotation between said first and second components for applying said clutch engagement force to said transfer clutch, and wherein said electric motor includes a rotor that is fixed for rotation with said second component of said operator unit, said motor is operable in its motor mode to drive said rotor so as to cause relative rotation between said first and second components, and said motor is operable in its brake mode to brake rotation of said rotor so as to cause relative rotation between said first and second components.

4. The power transmission device of claim 3 wherein said control system functions to control the direction and amount of rotation of said rotor which, in turn, controls the direction and amount of axial travel of said first component of said operator unit for varying the magnitude of said clutch engagement force.

5. The power transmission device of claim 3 wherein said transfer clutch includes a hub fixed for rotation with one of said first and second rotary members, a drum fixed for rotation with the other of said first and second rotary members, and a clutch pack of interleaved clutch plates operably disposed between said hub and drum, wherein said first component of said operator unit is a screw and said second component is a nut engaging said screw, and wherein said rotor is fixed to said nut such that actuation of said motor in either of its motor and brake modes causes said nut to rotate relative to said screw for causing said screw to move axially relative to said clutch pack.

6. The power transmission device of claim 5 wherein said screw is moveable between a retracted position and an extended position in response to the direction and magnitude of rotary movement of said nut and caused by actuation of said motor, whereby a minimum clutch engagement force is applied to said clutch pack when said screw is located in its retracted position and a maximum clutch engagement force is applied to said clutch pack when said screw is located in its extended position.

7. The power transmission device of claim 3 wherein said transfer clutch includes a hub fixed to one of said first and second rotary members, a drum fixed to the other of said first and second members, and a clutch pack disposed therebetween, wherein said first component of said operator unit is a nut and said second component is a screw on which said nut is rotatably supported, and wherein said rotor is fixed to said screw such that actuation of said motor in either of its motor and brake modes causes said screw to rotate relative to said nut for causing said nut to move axially relative to said clutch pack.

8. The power transmission device of claim 7 wherein said nut is moveable between a retracted position and an extended position in response to the direction and magnitude of rotary movement of said screw caused by actuation of said motor, whereby a minimum clutch engagement force is applied to said clutch pack when said nut is located in its retracted position and a maximum clutch engagement force is applied to said clutch pack when said nut is located in its extended position.

9. The power transmission device of claim 3 wherein said motor includes a coil and said rotor includes magnets located in close proximity to said coil, whereby rotation of said rotor causes said magnets to induce a magnetic field in said coil such that energization of said coil causes said rotor to be braked when said motor is operating in its brake mode.

10. The power transmission device of claim 1 wherein said control system functions to switch said motor from its motor mode into its brake mode when the rotary speed of one of said first and second rotary members exceeds a predetermined threshold speed value.

11. A power transfer device for use in a motor vehicle having a powertrain and first and second drivelines comprising:
    a first rotary member driven by the powertrain and adapted for connection to the first driveline;
    a second rotary member adapted for connection to the second driveline;
    a friction clutch operably disposed between said first and second rotary members;
    an operator having a first component in engagement with a second component with said first component supported to move axially in response to relative rotation between said first and second components, said first component adapted to exert a clutch engagement force on said friction clutch the magnitude of which corresponds to the axial position of said first component relative to said second component;
    an electric motor having a rotor fixed for rotation with said second component of said operator, said motor is operable in a motor mode wherein said rotor is driven to cause relative rotation between said first and second components and said motor is operable in a brake mode wherein said rotor is braked to cause relative rotation between said first and second components; and
    a control system for selectively switching said electric motor between its motor and brake modes based on the rotary speed of one of said first and second rotary members.

12. The power transmission device of claim 11 wherein said control system is further operable to control actuation of said motor in both of its motor and brake modes so as to control the direction and amount of relative rotation between said first and second components of said operator.

13. The power transmission device of claim 11 wherein said friction clutch includes a hub fixed for rotation with one of said first and second rotary members, a drum fixed for rotation with the other of said first and second rotary members, and a clutch pack operably disposed therebetween, wherein said first component of said operator is a nut and said second component is a screw, and wherein said rotor of said motor is fixed for rotation with said screw such that actuation of said motor causes said screw to rotate relative to said nut for causing said nut to move axially relative to said clutch pack.

14. The power transmission device of claim 13 wherein said nut is caused to move axially between a retracted position and an extended position in response to the direction and magnitude of rotary movement of said screw caused by actuation of said motor, and wherein a minimum clutch engagement force is exerted on said clutch pack when said nut is located in its retracted position and a maximum clutch engagement force is exerted on said clutch pack when said nut is located in its extended position.

15. The power transmission device of claim 11 wherein said motor includes a coil and said rotor includes magnets that are located in close proximity to said coil, and wherein rotation of said rotor with said second component of said operator causes said magnets to induce a magnetic field in said coil such that energization of said coil causes said rotor to be braked when said motor is operating in its brake mode.

16. The power transmission device of claim 11 wherein said friction clutch includes a hub fixed for rotation with one of said first and second rotary members, a drum fixed for rotation with the other of said first and second rotary members, and a clutch pack operably disposed, wherein said first component of said operator is a screw and said second component is a nut, and wherein said rotor of said motor is fixed for rotation with said nut such that actuation of said motor causes said nut to rotate relative to said screw for causing said screw to move axially relative to said clutch pack.

17. The power transmission device of claim 16 wherein said screw is caused to move axially between a retracted position and an extended position in response to the direction and magnitude of rotary movement of said nut caused by actuation of said motor, and wherein a minimum clutch engagement force is exerted on said clutch pack when said screw is located in its retracted position and a maximum clutch engagement force is exerted on said clutch pack when said screw is located in its extended position.

18. A power transmission device for use in a motor vehicle having a powertrain and first and second drivelines, comprising:
   a differential having an input driven by the powertrain and first and second outputs driving the first and second drivelines;
   a friction clutch operably disposed between any two of said input and said first and second outputs of said differential;
   a clutch actuator for generating a clutch engagement force to be applied to said friction clutch, said clutch actuator including a first component and a second component with said first component being axially moveable in response to relative rotation between said first and second components, said first component is adapted to exert a clutch engagement force on said friction clutch the magnitude of which corresponds to the axial position of said first component relative to said second component, and an electric motor having a rotor fixed for rotation with said second component, said motor is operable in a motor mode wherein said rotor is driven to cause relative rotation between said first and second components and said motor is operable in a brake mode wherein said rotor is braked to cause relative rotation between said first and second components; and
   a control system for selectively switching said motor between its motor and brake modes.

19. The power transmission device of claim 18 wherein said control system is operable to switch said motor into its motor mode when the rotary speed of one of said first and second outputs of said differential is less than a predetermined threshold speed value.

20. The power transmission device of claim 18 wherein said control system is further operable to control actuation of said motor in both of its motor and brake modes so as to control the direction and amount of relative rotations between said first and second components of said operator.

21. The power transmission device of claim 18 wherein said friction clutch includes a hub fixed for rotation with one of said first and second outputs, a drum fixed for rotation with the other of said first and second outputs, and a clutch pack operably disposed between said hub and drum, wherein said first component is a nut and said second component is a screw, and wherein said rotor of said motor is fixed for rotation with said screw such that actuation of said motor causes said screw to rotate relative to said nut for causing said nut to move axially relative to said clutch pack.

22. The power transmission device of claim 18 wherein said friction clutch includes a hub fixed for rotation with one of said first and second rotary outputs, a drum fixed for rotation with the other of said first and second rotary outputs, and a clutch pack operably disposed between said hub and drum, wherein said first component is a screw and said second component is a nut, and wherein said rotor of said motor is fixed for rotation with said nut such that actuation of said motor causes said nut to rotate relative to said screw for causing said screw to move axially relative to said clutch pack.

23. A power transmission device, comprising:
   a first rotary member;
   a second rotary member;
   a torque transfer mechanism for transferring drive torque from said first rotary member to said second rotary member, said torque transfer mechanism including a friction clutch operably disposed between said first and second rotary members and a clutch actuator for applying a clutch engagement force on said friction clutch, said clutch actuator including an electric motor having a rotor, and an operator mechanism having a first component fixed for rotation with said rotor and a second component supported for movement between a first position and a second position in response to relative rotation between said first and second components, said second component operable to exert a minimum clutch engagement force on said friction clutch when located in its first position and a maximum clutch engagement force when located in its second position, said motor is operable in a motor mode wherein said rotor is driven to cause relative rotation between said first and second components and in a brake mode wherein said rotor is braked to cause such relative rotation; and
   a control system for selectively switching said electric motor between its motor and brake modes.

24. The power transmission device of claim 23 wherein said control system functions to switch said motor from its motor mode into its brake mode when the rotary speed of one of said first and second rotary members exceeds a predetermined threshold speed value.

25. The power transmission device of claim 24 wherein said control system provides electrical power to drive said rotor when said motor is operating in its motor mode, and wherein electrical power generated by rotation of said rotor is used to brake said rotor when said motor is operating in its brake mode.

26. The power transmission device of claim 23 wherein said friction clutch assembly includes a hub fixed for rotation with one of said first and second rotary members, a drum fixed for rotation with the other of said first and second rotary members, and a clutch pack operably disposed between said hub and drum, wherein said first component of said operator mechanism is a screw and said second component is a nut, said rotor of said motor being fixed for rotation with said screw such that actuation of said motor causes said screw to rotate relative to said nut for causing said nut to move to said between its first and second positions.

27. The power transmission device of claim 23 wherein said friction clutch assembly includes a hub fixed for rotation with one of said first and second rotary members, a drum fixed for rotation with the other of said first and second rotary members, and a clutch pack operably disposed between said hub and drum, and wherein said first component of said operator mechanism is a nut and said second component is a screw, said rotor of said motor being fixed for rotation with said nut such that actuation of said motor causes said nut to rotate relative to said screw for causing said screw to move between its first and second positions.

28. The power transmission device of claim 23 wherein said first rotary member is a first shaft driving a first driveline of a motor vehicle, said second rotary member is a second shaft coupled to a second driveline of the motor vehicle, and wherein said torque transfer mechanism is operable to transfer drive torque from said first shaft to said second shaft.

29. The power transmission device of claim 28 defining a transfer case such that location of said second component in its first position releases engagement of said friction clutch so as to define a two-wheel drive mode, and location of said second component in its second position fully engages said friction clutch so as to define a part-time four-wheel drive mode, and wherein said control system is operable to control said electric motor for varying the position of said second component between its first and second positions to controllably vary the drive torque transferred from said first shaft to said second shaft so as to define an on-demand four-wheel drive mode.

30. The power transmission device of claim 29 further comprising sensors to detect a vehicle operating condition, said control system receiving input signals from said sensors and generating electric control signals based on said input signals which are supplied to said electric motor for controlling the direction and amount of rotary movement of said rotor.

31. The power transmission device of claim 28 defining a power take-off unit wherein said first shaft provides drive torque to a first differential associated with the first driveline, and wherein said second shaft is coupled to a second differential associated with the second driveline.

32. The power transmission device of claim 23 wherein said first rotary member is a drive shaft driven by a drivetrain of a motor vehicle, said second rotary member is a pinion shaft driving a differential associated with an axle assembly of the motor vehicle, and wherein said friction clutch is disposed between said drive shaft and said pinion shaft such that actuation of said clutch actuator is operable to transfer drive torque from said drive shaft to said pinion shaft.

33. The power transmission device of claim 23 wherein said first rotary member includes a first differential supplying drive torque to a pair of first wheels in a motor vehicle, and a transfer shaft driven by said first differential, said second member includes a drive shaft coupled to a second differential which interconnects a pair of second wheels in the motor vehicle, and wherein said friction clutch is disposed between said transfer shaft and said drive shaft.

34. The power transmission device of claim 23 wherein said first rotary member includes a first shaft supplying drive torque to a second shaft which is coupled to a first differential for driving a pair of first wheels in a motor vehicle, said second rotary member is a third shaft driving a second differential interconnecting a pair of second wheels of the motor vehicle, and wherein said friction clutch is operably disposed between said first and third shafts.

35. The power transmission device of claim 23 further including an interaxle differential driven by said first rotary member and having a first output driving a first driveline in a motor vehicle and a second output driving a second driveline in the motor vehicle, and wherein said friction clutch is operably disposed between said first and second outputs of said interaxle differential.

36. A power transfer system for a motor vehicle, comprising:
a powertrain operable to generate drive torque;
a first driveline having a first differential interconnecting a pair of first wheels;
a second driveline having a second differential interconnecting a pair of second wheels;
a power transmission device for transmitting drive torque from said powertrain to said first differential and having a torque transfer mechanism for selectively transmitting drive torque to said second differential, said torque transfer mechanism having a first rotary member driven by said powertrain, a second rotary member driving said second differential, a transfer clutch operably disposed between said first and second rotary members, and a first clutch actuator or engaging said transfer clutch, said first clutch actuator including a first operator unit for applying a clutch engagement force on said transfer clutch and a first electric motor operable in a motor mode and a brake mode for generating an output torque that is converted by said first operator unit into said clutch engagement force;
a limited slip device for limiting slip between said first wheels, said limited slip device having a bias clutch operably disposed between said first differential and one of said first wheels and a second clutch actuator for engaging said bias clutch, said second clutch actuator including a second operator unit for applying a clutch engagement force on said bias clutch and a second electric motor operable in a motor mode and a brake mode for generating an output torque that is converted by said second operator unit into said clutch engagement force; and
a control system operable for selectively switching said first electric motor between operation in its motor and brake modes based on the rotary speed of one of said first and second rotary members and selectively switching said second electric motor between operation in its motor and brake modes based on the rotary speed of one of said first wheels.

37. The power transfer system of claim 36 wherein said control system is operable to use electrical power regenerated during operation of said first electric motor in its brake mode to actuate said second electric motor in its motor mode.

38. The power transfer system of claim 37 wherein said control system is operable to use electrical power regenerated during operation of said second electric motor in its brake mode to actuate said first electric motor in its motor mode.

39. A power transmission device for use in a motor vehicle having a powertrain and first and second drivelines, comprising:

a differential having an input driven by the powertrain and first and second outputs driving the first and second drivelines;

a transfer clutch operably disposed between any two of said input and said first and second outputs of said differential;

a clutch actuator for controlling engagement of said transfer clutch, said clutch actuator including an operator unit operable to exert a clutch engagement force on said transfer clutch and an electric motor operable in a motor mode and a brake mode for generating an output torque that is converted by said operator unit into said clutch engagement force; and a control system for selectively switching said motor between its motor and brake modes.

40. The power transmission device of claim 39 wherein said operator unit includes first and second components with said first component adapted to move axially in response to relative rotation between said first and second components for applying said clutch engagement force to said transfer clutch, and wherein said electric motor includes a rotor that is fixed for rotation with said second component of said operator unit, said motor is operable in its motor mode to drive said rotor so as to cause relative rotation between said first and second components, and said motor is operable in its brake mode to brake rotation of said rotor so as to cause relative rotation between said first and second components.

41. A power transmission device, comprising:

a first rotary member;

a second rotary member;

a torque transfer mechanism for transferring drive torque between said first rotary member and said second rotary member, said torque transfer mechanism including a transfer clutch operably disposed between said first and second rotary members and a clutch actuator for controlling engagement of said transfer clutch, said clutch actuator including an operator unit operable to exert a clutch engagement force on said transfer clutch and an electric motor operable in a motor mode and a brake mode for generating an output torque that is converted by said operator unit into said clutch engagement force; and a control system for selectively switching said electric motor between its motor and brake modes.

42. The power transmission device of claim 41 wherein said operator unit includes first and second components with said first component adapted to move axially in response to relative rotation between said first and second components for applying said clutch engagement force to said transfer clutch, and wherein said electric motor includes a rotor that is fixed for rotation with said second component of said operator unit, said motor is operable in its motor mode to drive said rotor so as to cause relative rotation between said first and second components, and said motor is operable in its brake mode to brake rotation of said rotor so as to cause relative rotation between said first and second components.

43. The power transmission device of claim 42 wherein said control system provides electrical power to drive said rotor when said motor is operating in its motor mode, and wherein electrical power generated by rotation of said rotor is used to brake said rotor when said motor is operating in its brake mode.

44. The power transmission device of claim 41 wherein said first rotary member is a first shaft driving a first driveline of a motor vehicle, said second rotary member is a second shaft coupled to a second driveline of the motor vehicle, and wherein said torque transfer mechanism is operable to transfer drive torque from said first shaft to said second shaft.

45. The power transmission device of claim 41 defining a power take-off unit wherein said first rotary member provides drive torque to a first differential associated with a first driveline, and wherein said second rotary member is coupled to a second differential associated with a second driveline.

46. The power transmission device of claim 41 wherein said first rotary member is a drive shaft driven by a drivetrain of a motor vehicle, said second rotary member is a pinion shaft driving a differential associated with an axle assembly of the motor vehicle, and wherein said transfer clutch is disposed between said drive shaft and said pinion shaft such that actuation of said clutch actuator is operable to transfer drive torque from said drive shaft to said pinion shaft.

47. The power transmission device of claim 41 wherein said first rotary member includes a first differential supplying drive torque to a pair of first wheels in a motor vehicle, and a transfer shaft driven by said first differential, said second member includes a drive shaft coupled to a second differential which interconnects a pair of second wheels in the motor vehicle, and wherein said transfer clutch is disposed between said transfer shaft and said drive shaft.

48. The power transmission device of claim 41 wherein said first rotary member includes a first shaft supplying drive torque to a second shaft which is coupled to a first differential for driving a pair of first wheels in a motor vehicle, said second rotary member is a third shaft driving a second differential interconnecting a pair of second wheels of the motor vehicle, and wherein said transfer clutch is operably disposed between said first and third shafts.

49. The power transmission device of claim 41 further including an interaxle differential driven by said first rotary member and having a first output driving a first driveline in a motor vehicle and a second output driving a second driveline in the motor vehicle, and wherein said transfer clutch is operably disposed between said first and second outputs of said interaxle differential.

* * * * *